(12) United States Patent
Chang

(10) Patent No.: US 12,471,805 B2
(45) Date of Patent: Nov. 18, 2025

(54) METHOD AND SYSTEM FOR ANALYZING A POSTURE OF A RIDER RIDING A BICYCLE

(71) Applicant: IMOTEK Inc., Taipei (TW)

(72) Inventor: Ching-Wei Chang, Taipei (TW)

(73) Assignee: IMOTEK INC., Taipei (TW)

( * ) Notice: Subject to any disclaimer, the term of this patent is extended or adjusted under 35 U.S.C. 154(b) by 1133 days.

(21) Appl. No.: 17/379,209

(22) Filed: Jul. 19, 2021

(65) Prior Publication Data

US 2023/0015818 A1      Jan. 19, 2023

(51) Int. Cl.
*A61B 5/11* (2006.01)
*A61B 5/00* (2006.01)

(52) U.S. Cl.
CPC .......... *A61B 5/1116* (2013.01); *A61B 5/1126* (2013.01); *A61B 5/6828* (2013.01); *A61B 5/7225* (2013.01); *A61B 5/725* (2013.01); *A61B 5/7257* (2013.01); *A61B 5/742* (2013.01); *A61B 2562/0219* (2013.01)

(58) Field of Classification Search
CPC ... A61B 5/1116; A61B 5/1126; A61B 5/1122; A61B 5/1121; A61B 5/112; A61B 5/11; A61B 5/00; A61B 5/6828; A61B 5/7225; A61B 5/725; A61B 5/7235; A61B 5/742; A61B 2562/0219; A61B 5/25; A61B 2560/0223; A61B 5/7282
See application file for complete search history.

(56) References Cited

U.S. PATENT DOCUMENTS

| | | | | |
|---|---|---|---|---|
| 2014/0228649 | A1* | 8/2014 | Rayner | A61B 5/0002 600/595 |
| 2016/0046339 | A1* | 2/2016 | Chen | H01H 9/02 324/207.13 |
| 2017/0138807 | A1* | 5/2017 | Miau | G01L 3/24 |
| 2018/0280761 | A1* | 10/2018 | Izuru | B62J 50/22 |
| 2019/0192908 | A1* | 6/2019 | Chang | G01P 13/04 |

* cited by examiner

*Primary Examiner* — Mohamed Charioui
(74) *Attorney, Agent, or Firm* — Birch, Stewart, Kolasch & Birch, LLP

(57) ABSTRACT

A method for evaluating a posture of a rider riding a bicycle includes: continuously receiving a plurality of sensor datasets, each of the sensor datasets being associated with a specific time instance and includes data generated by an inertial measurement set and an electrical signal sensor set; determining a plurality of top time instances and a plurality of bottom time instances, and establishing a number of riding periods based on the plurality of top time instances and the plurality of bottom time instances; and for each of the riding periods, generating an evaluation result with respect to a number of sensor datasets received within the riding period.

18 Claims, 18 Drawing Sheets

METHOD AND SYSTEM FOR ANALYZING A POSTURE OF A RIDER RIDING A BICYCLE

FIELD

The disclosure relates to a method and a system for evaluating a posture of a rider riding a bicycle.

BACKGROUND

When a rider is riding a bicycle, an inappropriate posture may result in uneven action of muscles, which may lead to increased muscle fatigue, application of inappropriate torque to the joints, and associated injuries.

Taiwanese Patent No. 1657354 discloses an action analysis method and system. The method is performed by acquiring a series of pieces of sensed data generated at successive time points by a sensing device positioned at a knee joint of a rider of a bicycle. The method is to determine a trajectory formed by a plurality of data points corresponding respectively to the pieces of sensed data, and to generate an estimation result regarding correctness of a riding posture of the rider based on the at least one loop of the trajectory.

SUMMARY

Therefore, an object of the disclosure is to provide a method for evaluating a posture of a rider riding a bicycle.

According to one embodiment of the disclosure, the is implemented using a system that includes a processor, and a sensor unit which is coupled to the processor and which includes an inertial measurement set and an electrical signal sensor set that are to be worn by the rider. The method includes:
- while the rider is riding the bicycle, continuously receiving, by the processor, a plurality of original sensor datasets from the sensor unit, each of the original sensor datasets being associated with a specific time instance and including data generated by the inertial measurement set and the electrical signal sensor set;
- a) determining, by the processor, a plurality of extreme time instances at which the inertial measurement set was at one of a relative highest location and a relative lowest location;
- b) establishing, by the processor, a number of riding periods based on the plurality of extreme time instances; and
- c) for each of the riding periods, generating, by the processor, an analysis result with respect to a number of original sensor datasets received within the riding period.

Another object of the disclosure is to provide a system that is configured to implement the above-mentioned method.

Another object of the disclosure is to provide a non-transitory computer-readable storage medium storing instructions that, when executed by a processor, cause the processor to implement the above-mentioned method.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
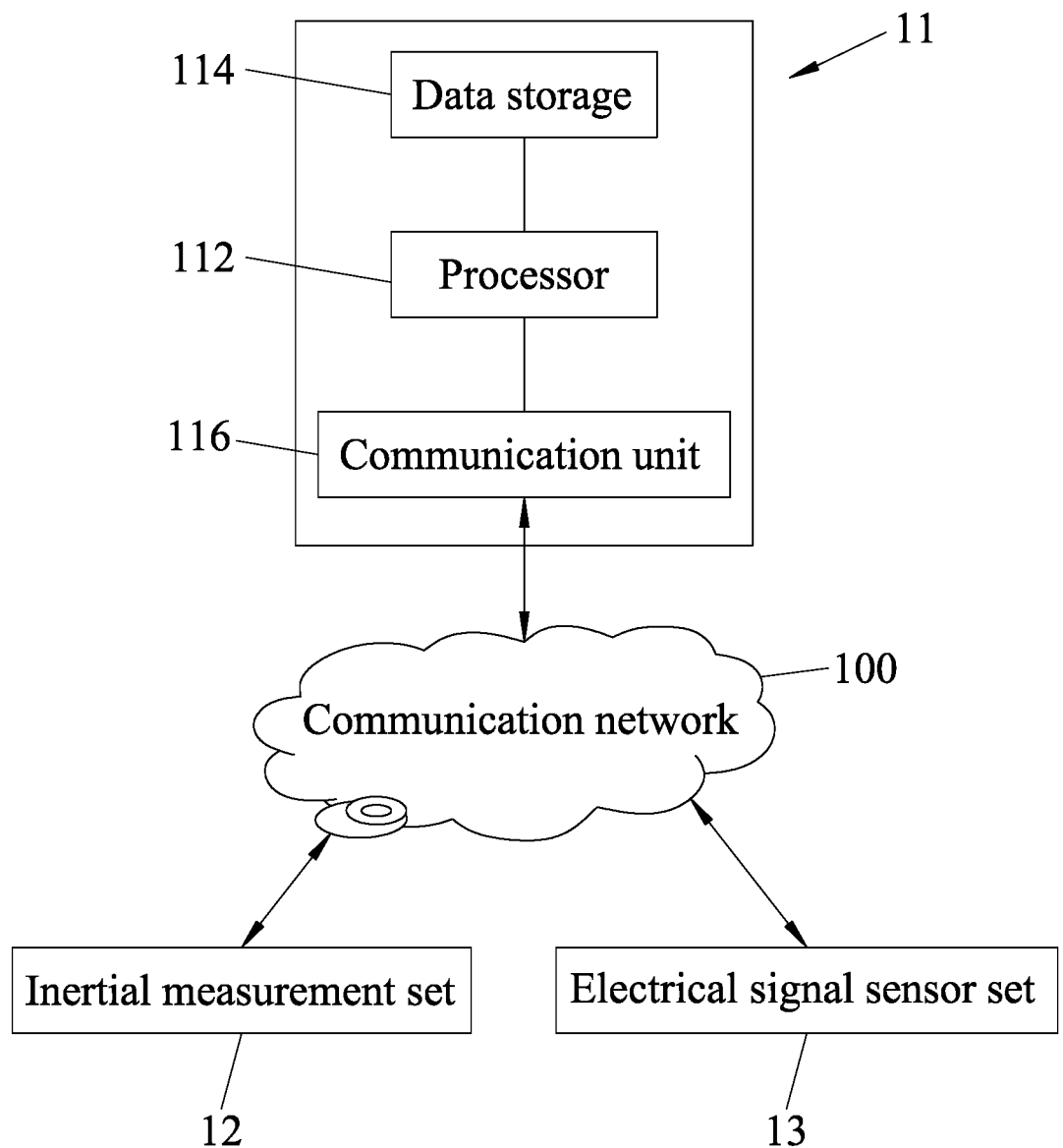
FIG. 1 is a block diagram illustrating a system according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" may refer to a direct connection among a plurality of electrical apparatus/devices/equipments via an electrically conductive material (e.g., an electrical wire), or an indirect connection between two electrical apparatus/devices/equipments via another one or more apparatus/device/equipment, or wireless communication.

FIG. 1 is a block diagram illustrating a system according to one embodiment of the disclosure. The system includes an electronic device 11, and a sensor unit that includes an inertial measurement set 12 and an electrical signal sensor set 13.

The electronic device 11 may be embodied using a personal computer, a laptop, a tablet, a smartphone, or other commercially available computing devices. The electronic device 11 includes a processor 112, a data storage 114 and a communication unit 116.

The processor 112 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The data storage 114 may be embodied using a machine- or computer-readable storage medium such as random access memory (RAM), read only memory (ROM), programmable ROM (PROM), firmware, flash memory, etc. The data storage 114 stores a software application that may be executed by the processor 112 for causing the processor 112 to perform operations set forth in the disclosure.

The communication unit 116 may include at least one of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) and/or fifth generation (5G) of wireless mobile telecommunications technology, and/or the like.

In this embodiment, the electronic device 11 is coupled to each of the inertial measurement set 12 and the electrical signal sensor set 13 via a wireless connection, such as via a communication network 100 (e.g., the Internet, a Bluetooth® connection, a radio frequency identification (RFID) connection, a Wi-Fi connection, etc.).

The inertial measurement set 12 is adapted to be worn by a rider riding a bicycle (e.g., a person), and includes a gyroscope and/or an accelerometer (not shown in the drawings).

The gyroscope of the inertial measurement set 12, when activated, may be configured to continuously generate multiple pieces of angular data at a series of time instances, respectively. Each of the pieces of angular data may be associated with a specific time instance, and include an angular velocity of the gyroscope with respect to an axis that corresponds with a wheel axle of the bicycle (not shown in the drawings). In this embodiment, at a given time instance, three angular velocities are generated, each being measured with respect to one of three distinct axes (e.g., the three axes that constitute a Cartesian coordinate system). Specifically, the three axes may respectively be parallel to a front-rear direction with respect to the bicycle, a left-right direction with respect to the bicycle, and a top-bottom direction with respect to the bicycle.

The accelerometer of the inertial measurement set 12, when activated, may be configured to continuously generate multiple pieces of acceleration data at a series of time instances, respectively. Each of the pieces of acceleration data may be associated with a specific time instance, and include a front-rear acceleration associated with the front-rear direction with respect to the bicycle, a left-right acceleration associated with the left-right direction with respect to the bicycle, and a top-bottom acceleration associated with the top-bottom direction with respect to the bicycle. The angular data and the acceleration data may cooperatively serve as measurement data.

It is noted that, in different embodiments, the inertial measurement set 12 may include only one of the gyroscope and the accelerometer, and in turn, only one of the angular data and the acceleration data is generated by the inertial measurement set 12 to serve as the measurement data. In the following description, the measurement data refers to one of the angular data and the acceleration data.

The electrical signal sensor set 13 includes a number of electrical signal sensors (not shown in the drawings) that are to be worn by the rider on different locations. Each of the electrical signal sensors is configured to continuously generate multiple pieces of sensing data at a series of time instances, respectively. For each of the electrical signal sensors, the sensing data includes an electrical potential associated with a specific skeleton muscle on which the electrical signal sensor is placed.

In one embodiment, the electrical signal sensor set 13 includes a first electrical signal sensor to be placed on a left vastus medialis muscle of the rider, a second electrical signal sensor to be placed on a left vastus lateralis muscle of the rider, a third electrical signal sensor to be placed on a right vastus medialis muscle of the rider, and a fourth electrical signal sensor to be placed on a right vastus lateralis muscle of the rider. In other embodiments, additional electrical signal sensor (s) may be placed on one or more of a left gastrocnemius muscle, a right gastrocnemius muscle, a left tibialis anterior muscle, a right tibialis anterior muscle, a left gluteus maximus muscle, a right gluteus maximus muscle, a left rectus femoris muscle, a right rectus femoris muscle, a left hamstring muscle, and a right hamstring muscle.

Figure 2:
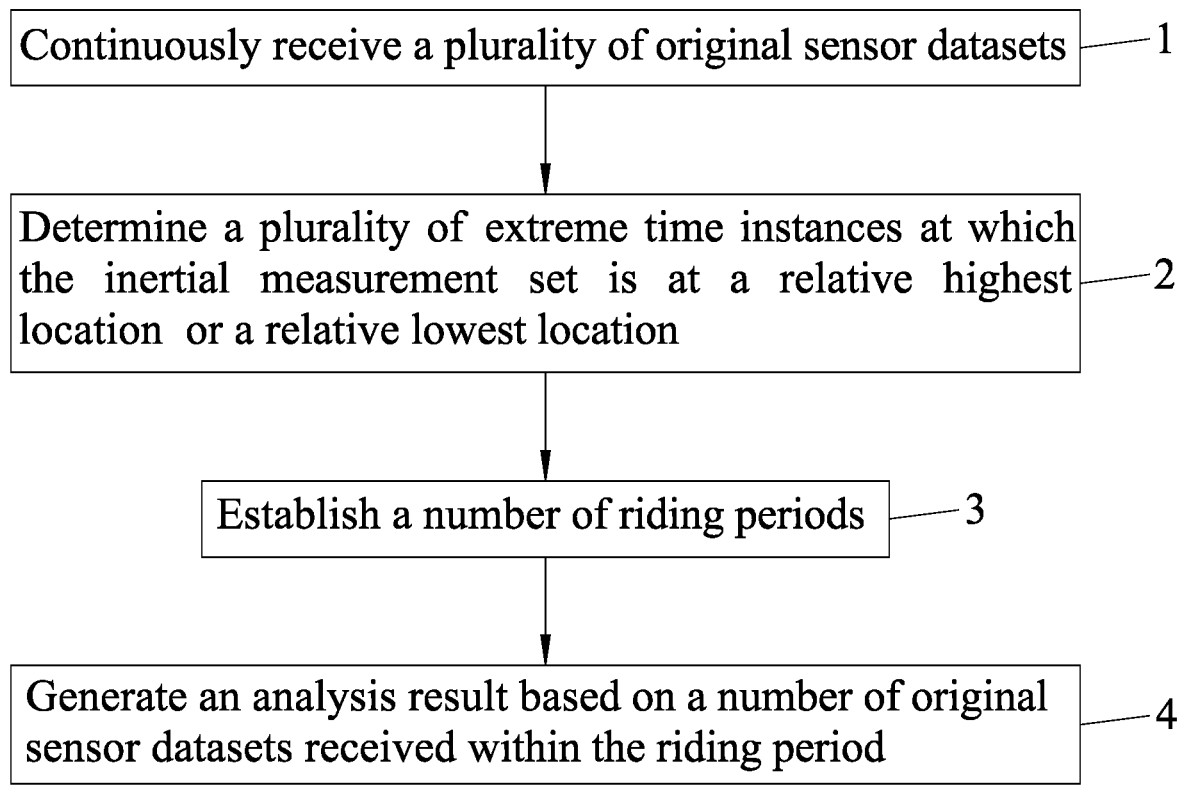
FIG. 2 is a flow chart illustrating steps of a method for analyzing a posture of a rider riding a bicycle according to one embodiment of the disclosure.

FIG. 2 is a flow chart illustrating steps of a method for analyzing a posture of a rider riding a bicycle according to one embodiment of the disclosure. The method may be implemented using a system as shown in FIG. 1, with the inertial measurement set 12 and the electrical signal sensor set 13 being placed on the rider. The electronic device 11 may be embodied using a smartphone that executes an application software, and may include a display interface (e.g., a touch screen) that enables interaction with the rider.

In step 1, while the rider is riding the bicycle, the processor 112 continuously receives a plurality of original sensor datasets from the sensor unit. Each of the original sensor datasets is associated with a specific time instance and includes data generated by the inertial measurement set 12 and the electrical signal sensor set 13.

Specifically, in this embodiment, the inertial measurement set 12 and the electrical signal sensor set are configured to generate the respective measurement data and the sensing data synchronously. That is to say, at a given time instance, a piece of measurement data and a piece of sensing data are generated. Afterward, the piece of measurement data and the piece of sensing data may be transmitted to the electronic device 11 as an original sensor dataset. In this embodiment, a number N of original sensor datasets (N≥2), that are associated respectively with a number N of successive time instances, are generated by the sensor unit and are received by the electronic device 11.

In step 2, the processor 112 determines a plurality of extreme time instances at which the inertial measurement set 12 is at a relative highest location (also known as a top dead centre (TDC)) or a relative lowest location (also known as a bottom dead centre (BDC)). Specifically, in some embodiments, the processor 112 determines a plurality of top time instances at which the inertial measurement set 12 is at the relative highest location (TDC), and determines a plurality of bottom time instances at which the inertial measurement set 12 is at the relative lowest location (BDC).

It is noted that a number of ways may be used to implement the operations of step 2. The following paragraphs describe some exemplary ways for implementing the operations of step 2 according to some embodiments of the disclosure.

Figure 3:
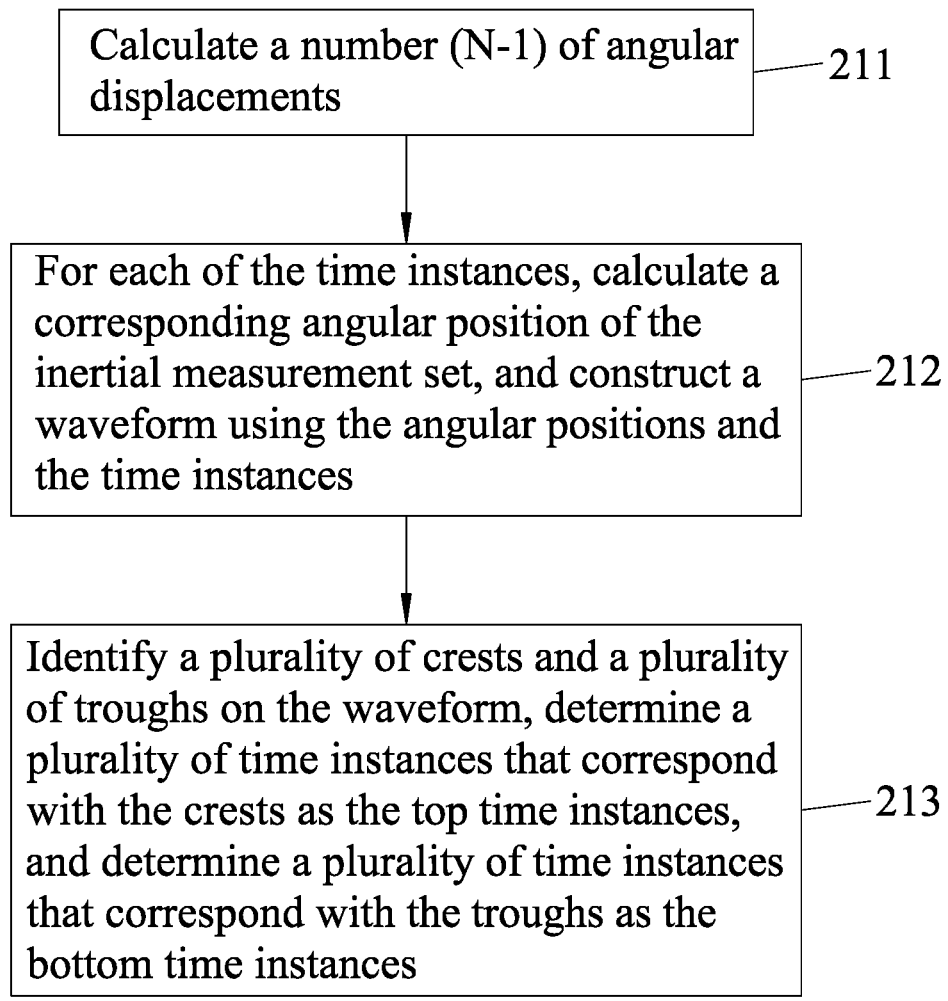
FIG. 3 is a flow chart illustrating sub-steps of a first exemplary implementation of a step of determining a plurality of top time instances and a plurality of bottom time instances according to some embodiments of the disclosure.

FIG. 3 is a flow chart illustrating sub-steps of a first exemplary implementation of step 2 according to some embodiments of the disclosure. In this implementation, the inertial measurement set 12 includes a gyroscope worn on a leg of the rider, and each of the original sensor datasets includes an angular velocity of the inertial measurement set 12 with respect to an axis that corresponds with a wheel axle of the bicycle. The axis may be parallel with the wheel axle (that is, parallel with a left-right direction from the perspective of the rider).

In sub-step 211, for the number N of original sensor datasets, the processor 112 calculates a number (N−1) of angular displacements. Each of the angular displacements is associated with a time period between two successive time instances, and is calculated based on the angular velocities at the two successive time instances. It is noted that the angular displacements thus calculated may correspond with a pitch value represented by Euler angles.

Figure 4:
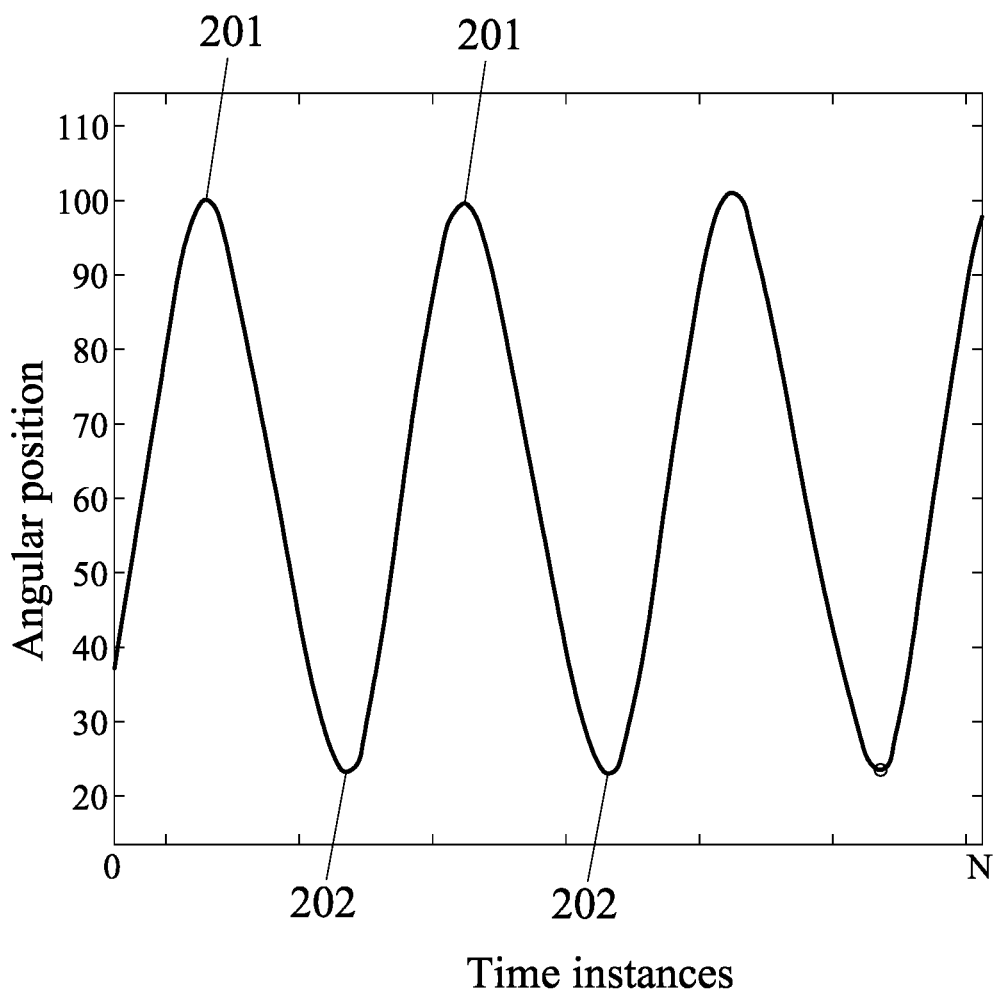
FIG. 4 illustrates a waveform constructed in the first exemplary implementation.

In sub-step 212, for each of the time instances, the processor 112 calculates a corresponding angular position of the inertial measurement set 12, and constructs a waveform using the angular positions and the time instances. FIG. 4 illustrates a waveform of the angular positions over the time instances constructed in sub-step 212.

Specifically, the calculation of the angular position is based on a recorded initial angular position of the inertial measurement set 12 (e.g., 40 degrees) and the angular displacements associated with the time instances.

In sub-step 213, the processor 112 identifies a plurality of crests and a plurality of troughs on the waveform constructed in sub-step 212, determines a plurality of time instances that correspond with the crests as the top time instances, and determines a plurality of time instances that correspond with the troughs as the bottom time instances. In the waveform of FIG. 4, the time instances at which the crests occur are determined as top time instances 201, and the time instances at which the troughs occur are determined as bottom time instances 202.

Figure 5:
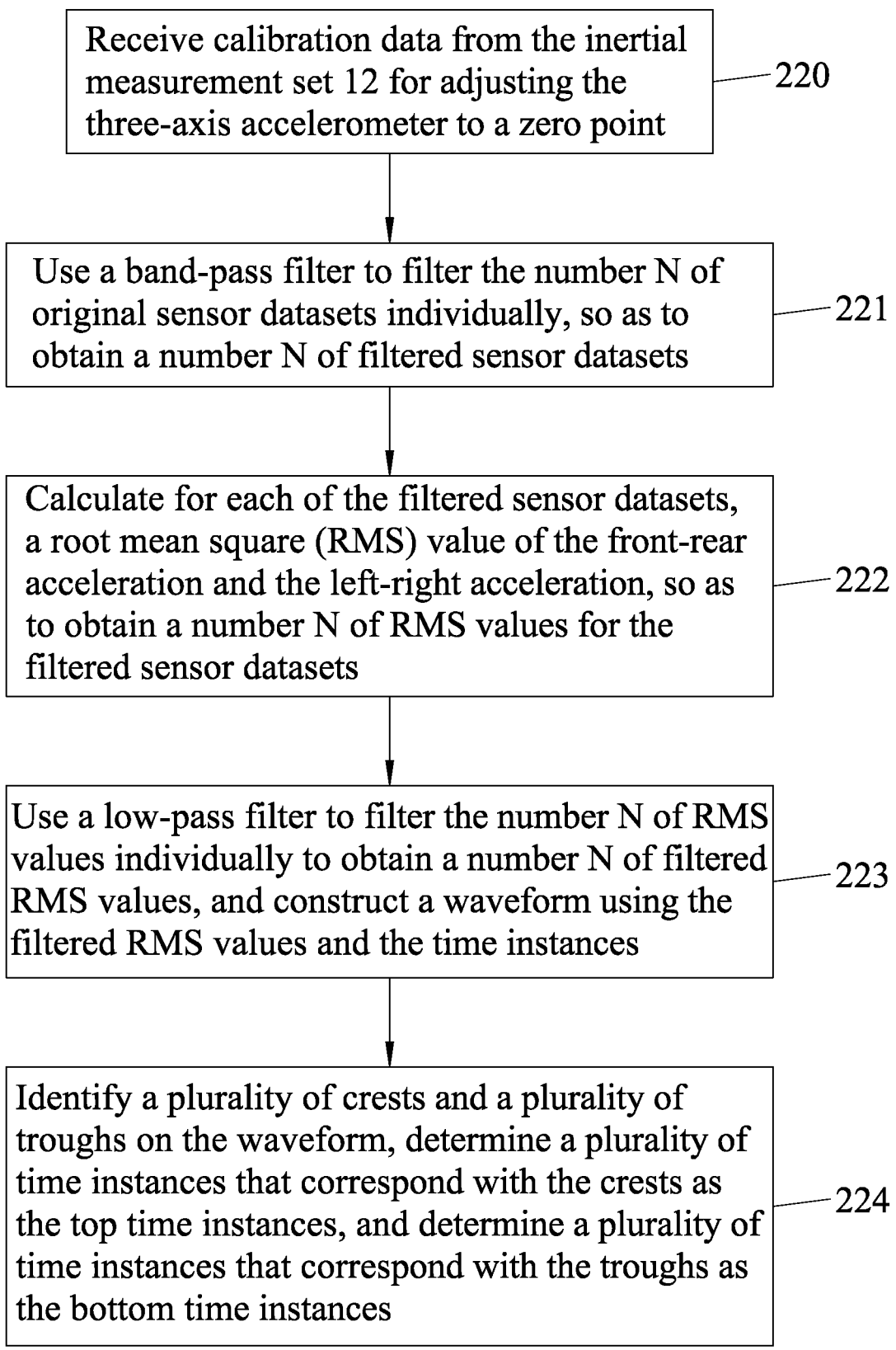
FIG. 5 is a flow chart illustrating sub-steps of a second exemplary implementation of the step of determining the plurality of top time instances and the plurality of bottom time instances according to some embodiments of the disclosure.

FIG. 5 is a flow chart illustrating sub-steps of a second exemplary implementation of step 2 according to some embodiments of the disclosure. In this implementation, the inertial measurement set 12 includes a three-axis accelerometer worn on a shank of the rider, and a number N of original sensor datasets are received from the sensor unit at a number N of corresponding successive time instances. Each of the original sensor datasets includes a front-rear acceleration associated with the front-rear direction with respect to the bicycle, a left-right acceleration associated with the left-right direction with respect to the bicycle, and a top-bottom acceleration associated with the top-bottom direction with respect to the bicycle.

In sub-step 220, the processor 112 receives calibration data from the inertial measurement set 12 for adjusting the three-axis accelerometer to a zero point (i.e., performing zeroing on the inertial measurement set 12). This may be done by the rider moving the leg to a lowest possible position (i.e., placing a peddle at a bottom position where the inertial measurement set 12 is at the BDC), and stopping for a predetermined time period such that the data generated by the inertial measurement set 12 during the predetermined time period is transmitted to the electronic device 11 to serve as the calibration data.

In sub-step 221, the electronic device 11 uses a band-pass filter to filter the number N of original sensor datasets individually, so as to obtain a number N of filtered sensor datasets.

In sub-step 222, the processor 112 calculates for each of the filtered sensor datasets, a root mean square (RMS) value of the front-rear acceleration and the left-right acceleration, so as to obtain a number N of RMS values for the filtered sensor datasets. The RMS value may be expressed using the following equation $$RMS_i = \sqrt{\frac{x_i^2 + y_i^2}{2}}$$

where $x_i$ represents the front-rear acceleration of an $i^{th}$ filtered sensor dataset, $y_i$ represents the left-right acceleration the $i^{th}$ filtered sensor dataset, and $i=1, 2, \ldots, N$.

Figure 6:
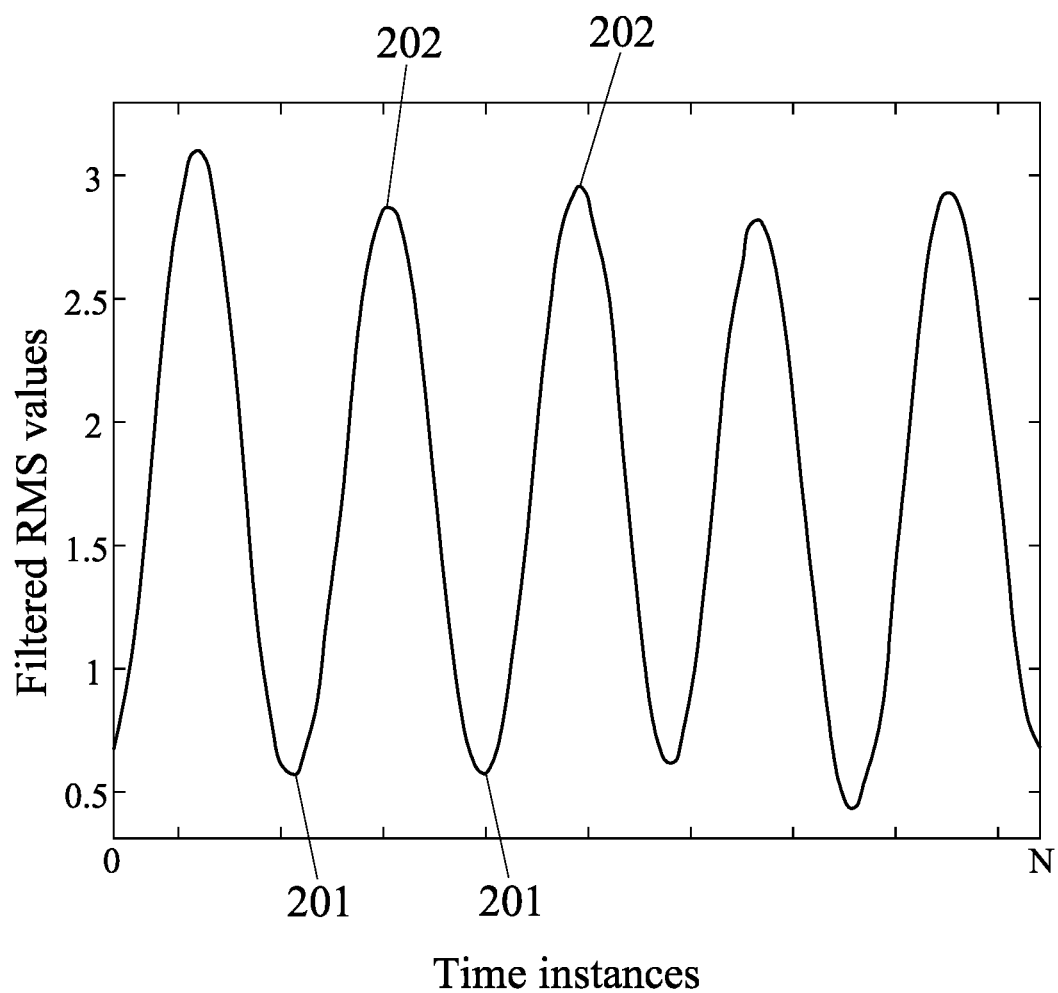
FIG. 6 illustrates a waveform constructed in the second exemplary implementation.

In sub-step 223, the electronic device 11 uses a low-pass filter to filter the number N of RMS values individually to obtain a number N of filtered RMS values, and constructs a waveform using the filtered RMS values and the time instances. FIG. 6 illustrates a waveform of the filtered RMS values over the time instances constructed in sub-step 223.

In sub-step 224, the processor 112 identifies a plurality of crests and a plurality of troughs on the waveform constructed in sub-step 223, determines a plurality of time instances that correspond with the crests as the top time instances, and determines a plurality of time instances that correspond with the troughs as the bottom time instances. In the waveform of FIG. 6, the time instances at which the troughs occur are determined as top time instances 201, and the time instances at which the crests occur are determined as bottom time instances 202.

Figure 7:
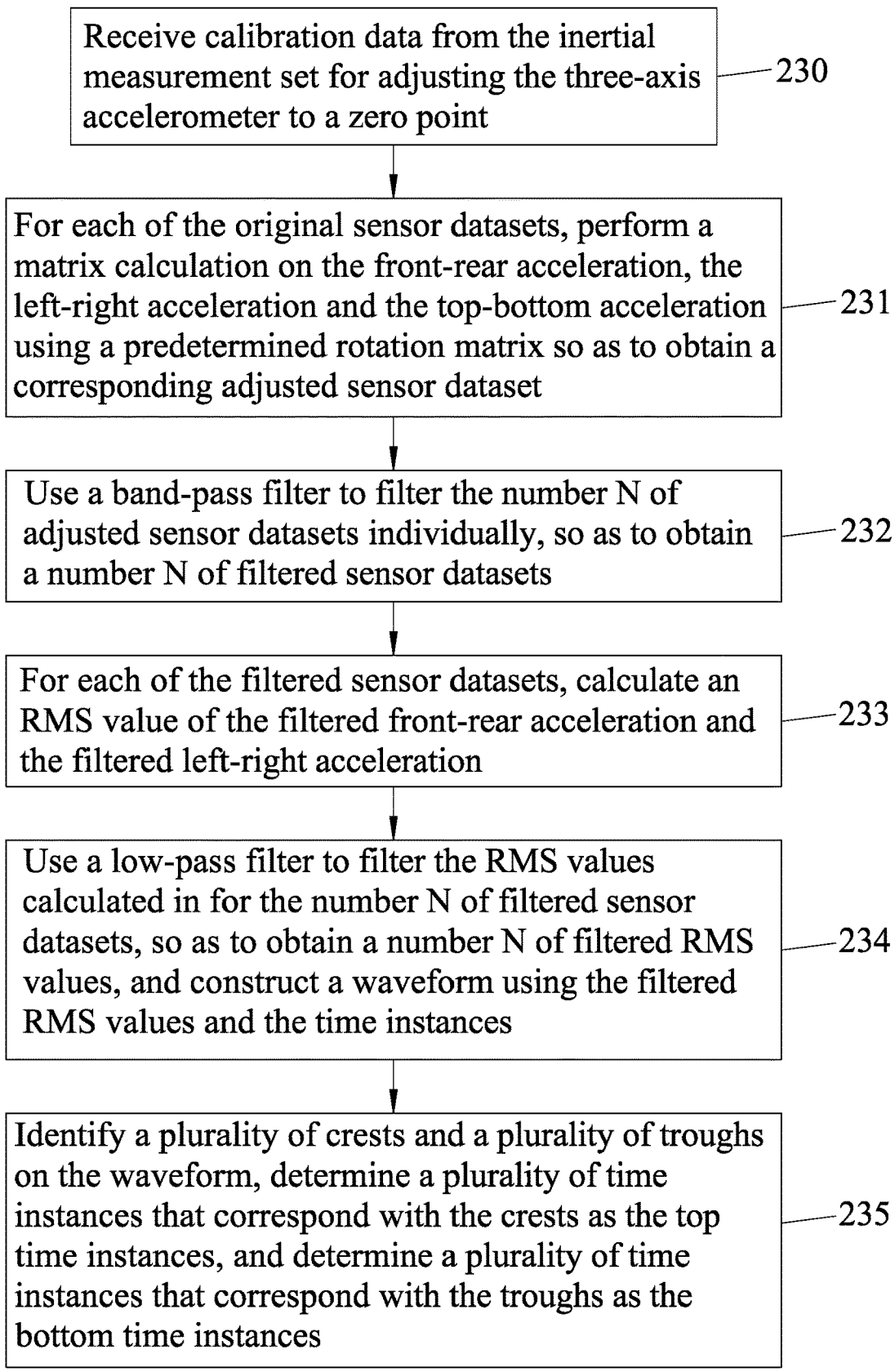
FIG. 7 is a flow chart illustrating sub-steps of a third exemplary implementation of the step of determining the plurality of top time instances and the plurality of bottom time instances according to some embodiments of the disclosure.

FIG. 7 is a flow chart illustrating sub-steps of a third exemplary implementation of step 2 according to some embodiments of the disclosure. In this implementation, the inertial measurement set 12 includes a three-axis accelerometer worn on a shank of the rider. A number N of original sensor datasets are received from the sensor unit at a number N of corresponding successive time instances. Each of the original sensor datasets includes a front-rear acceleration associated with the front-rear direction with respect to the bicycle, a left-right acceleration associated with the left-right direction with respect to the bicycle, and a top-bottom acceleration associated with the top-bottom direction with respect to the bicycle.

In sub-step 230, the processor 112 receives calibration data from the inertial measurement set 12 for adjusting the three-axis accelerometer to a zero point. This may be done by the rider standing on the ground and holding still for a predetermined time period such that the data generated by the inertial measurement set 12 during the predetermined time period is transmitted to the electronic device 11 to serve as the calibration data.

In step 231, for each of the original sensor datasets, the processor 112 performs a matrix calculation on the front-rear acceleration, the left-right acceleration and the top-bottom acceleration using a predetermined rotation matrix so as to obtain a corresponding adjusted sensor dataset. Consequently, a number N of adjusted sensor datasets are obtained for the number N of original sensor datasets.

Specifically, the predetermined rotation matrix R may be expressed using the following equations:

$$R = R_x(\theta_x)R_y(\theta_y)R_z(\theta_z);$$

$$R_x(\theta_{xi}) = \begin{bmatrix} 1 & 0 & 0 \\ 0 & \cos\theta_{xi} & -\sin\theta_{xi} \\ 0 & \sin\theta_{xi} & \cos\theta_{xi} \end{bmatrix};$$

$$R_y(\theta_{yi}) = \begin{bmatrix} \cos\theta_{yi} & 0 & \sin\theta_{yi} \\ 0 & 1 & 0 \\ -\sin\theta_{yi} & 0 & \cos\theta_{yi} \end{bmatrix}; \text{ and}$$

$$R_z(\theta_{zi}) = \begin{bmatrix} \cos\theta_{zi} & -\sin\theta_{zi} & 0 \\ \sin\theta_{zi} & \cos\theta_{zi} & 0 \\ 0 & 0 & 1 \end{bmatrix};$$

where $R_x(\theta_{xi})$ represents a rotation matrix associated with an active transformation of the inertial measurement set 12 with respect to an X axis (roll axis) in a Cartesian coordinate system at an $i^{th}$ time instance, $\theta_{xi}$ represents a roll angle recorded by the the inertial measurement set 12 at the $i^{th}$ time instance, $R_y(\theta_{yi})$ represents a rotation matrix associated with an active transformation of the inertial measurement set 12 with respect to a Y axis (pitch axis) in the Cartesian coordinate system at the $i^{th}$ time instance, $\theta_{yi}$ represents a pitch angle recorded by the inertial measurement set 12 at the $i^{th}$ time instance, $R_z(\theta_{zi})$ represents a rotation matrix associated with an active transformation of the inertial measurement set 12 with respect to a Z axis (yaw axis) in the Cartesian coordinate system at the $i^{th}$ time instance, and $\theta_{zi}$ represents a yaw angle recorded by the inertial measurement set 12 at the $i^{th}$ time instance.

In this embodiment, for each of the original sensor datasets, the matrix calculation may be in the form of a matrix multiplication of the predetermined rotation matrix R and a column vector constructed by the front-rear acceleration, the left-right acceleration and the top-bottom acceleration, so as to obtain a rotated front-rear acceleration, a rotated left-right acceleration and a rotated top-bottom acceleration. Afterward, a transpose matrix of the predetermined rotation matrix R is used for another matrix multiplication on a column vector constructed by the rotated front-rear acceleration, the rotated left-right acceleration and the rotated top-bottom acceleration, with the rotated top-bottom acceleration being subtracted by gravity of Earth (i.e., 1 g or 9.8 m/s²). The above matrix calculation may be expressed using the following equations:

$$R \times \begin{bmatrix} X_1 \\ Y_1 \\ Z_1 \end{bmatrix} = \begin{bmatrix} X_2 \\ Y_2 \\ Z_2 \end{bmatrix}; \text{ and}$$

$$R^T \times \begin{bmatrix} X_2 \\ Y_2 \\ Z_2 - g \end{bmatrix} = \begin{bmatrix} X_3 \\ Y_3 \\ Z_3 \end{bmatrix};$$

where $X_1$, $Y_1$ and $Z_1$ represent the front-rear acceleration, the left-right acceleration and the top-bottom acceleration, respectively, $X_2$, $Y_2$ and $Z_2$ represent the rotated front-rear acceleration, the rotated left-right acceleration and the rotated top-bottom acceleration, respectively, and $X_3$, $Y_3$ and $Z_3$ represent an adjusted front-rear acceleration, an adjusted left-right acceleration and an adjusted top-bottom acceleration, respectively.

The adjusted front-rear acceleration, the adjusted left-right acceleration and the adjusted top-bottom acceleration constitute the adjusted sensor dataset associated with the specific time instance.

It is noted that in other embodiments, the predetermined rotation matrix R may be different from that as described above.

In sub-step 232, the electronic device 11 uses a band-pass filter to filter the adjusted sensor datasets individually, so as to obtain a number N of filtered sensor datasets. Each of the filtered sensor datasets includes a filtered front-rear acceleration, a filtered left-right acceleration and a filtered top-bottom acceleration.

In sub-step 233, for each of the filtered sensor datasets, the processor 112 calculates an RMS value of the filtered front-rear acceleration and the filtered left-right acceleration. It is noted that the calculation of the RMS value may be implemented in a manner similar to that as described in sub-step 222, and details thereof are omitted herein for the sake of brevity.

Figure 8:
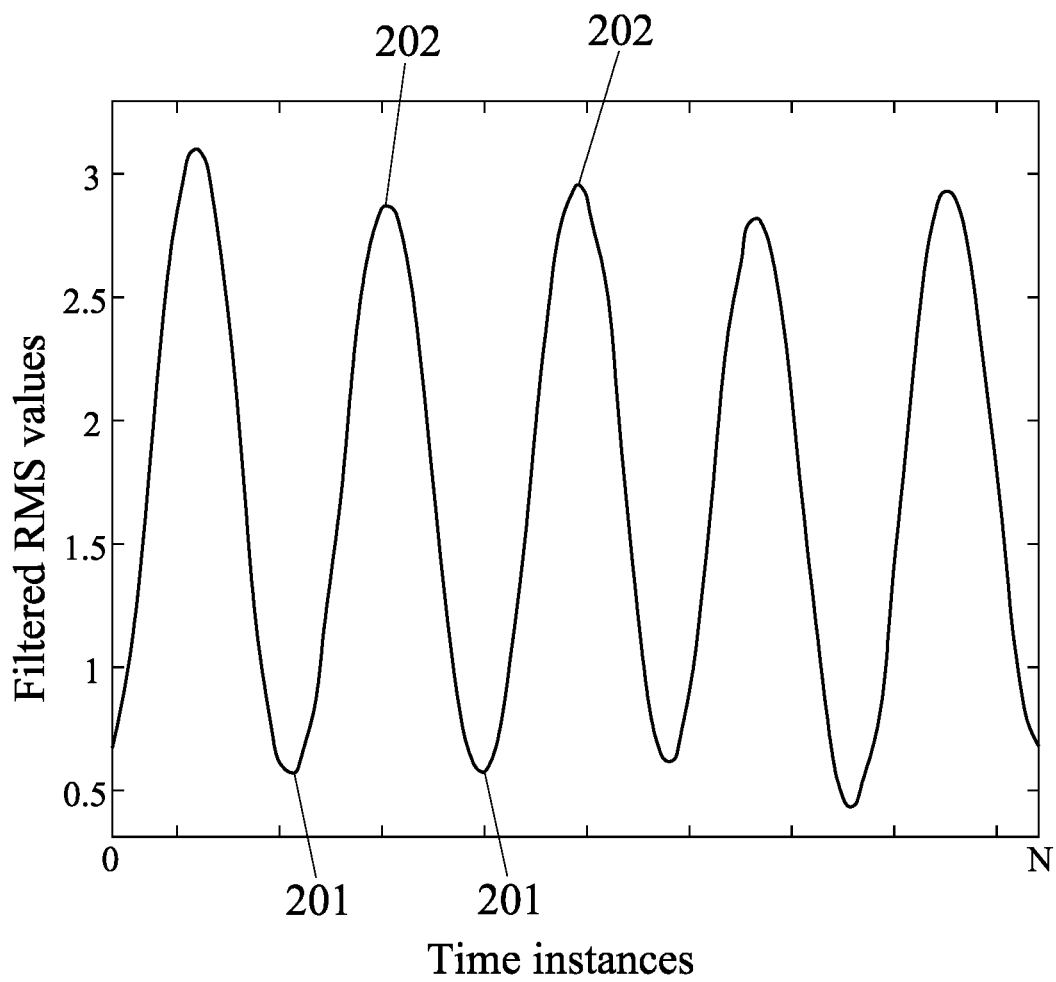
FIG. 8 illustrates a waveform constructed in the third exemplary implementation.

In sub-step 234, the electronic device 11 uses a low-pass filter to filter the RMS values calculated in sub-step 233 for the number N of filtered sensor datasets, so as to obtain a number N of filtered RMS values, and constructs a waveform using the filtered RMS values and the time instances. FIG. 8 illustrates a waveform of the filtered RMS values over the time instances constructed in sub-step 234.

In sub-step 235, the processor 112 identifies a plurality of crests and a plurality of troughs on the waveform, determines a plurality of time instances that correspond with the crests as the top time instances, and determines a plurality of time instances that correspond with the troughs as the bottom time instances. In the waveform of FIG. 8, the time instances at which the troughs occur are determined as top time instances 201, and the time instances at which the crests occur are determined as bottom time instances 202.

Figure 9:
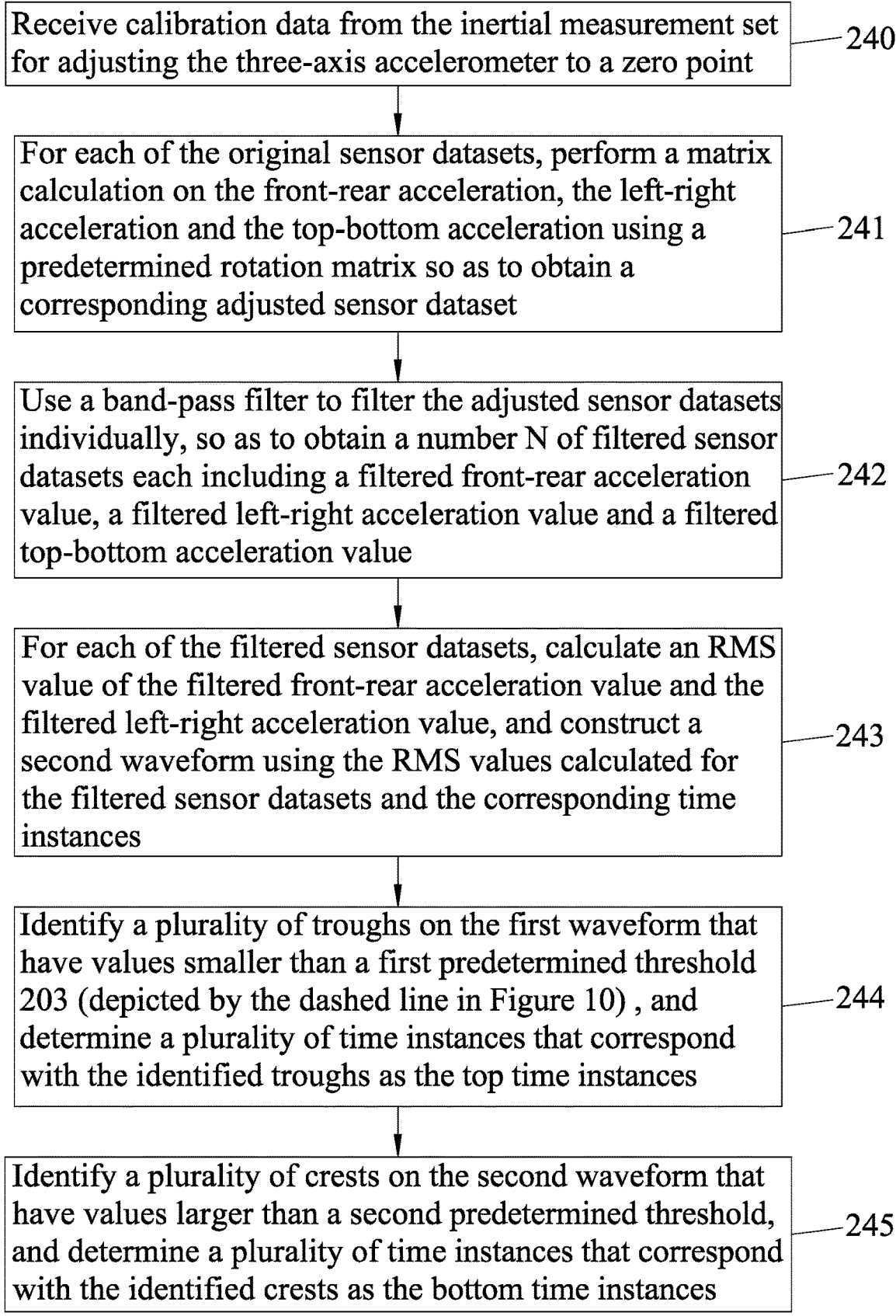
FIG. 9 is a flow chart illustrating sub-steps of a fourth exemplary implementation of the step of determining the plurality of top time instances and the plurality of bottom time instances according to some embodiments of the disclosure.

FIG. 9 is a flow chart illustrating sub-steps of a fourth exemplary implementation of step 2 according to some embodiments of the disclosure. In this implementation, the inertial measurement set 12 includes a three-axis accelerometer worn on a thigh of the rider. A number N of original sensor datasets are received from the sensor unit at a number N of corresponding successive time instances. Each of the original sensor datasets includes a front-rear acceleration associated with the front-rear direction with respect to the bicycle, a left-right acceleration associated with the left-right direction with respect to the bicycle, and a top-bottom acceleration associated with the top-bottom direction with respect to the bicycle.

In sub-step 240, the processor 112 receives calibration data from the inertial measurement set 12 for adjusting the three-axis accelerometer to a zero point. This may be done by the rider standing on the ground and stopping for a predetermined time period such that the data generated by the inertial measurement set 12 during the predetermined time period is transmitted to the electronic device 11 to serve as the calibration data.

In sub-step 241, for each of the original sensor datasets, the processor 112 performs a matrix calculation on the front-rear acceleration, the left-right acceleration and the top-bottom acceleration using a predetermined rotation matrix so as to obtain a corresponding adjusted sensor dataset. Consequently, a number N of adjusted sensor datasets are obtained for the number N of original sensor datasets. It is noted that the operations of the matrix calculation may be implemented in a manner similar to that as described in sub-step 231, and details thereof are omitted herein for the sake of brevity.

Figure 10:
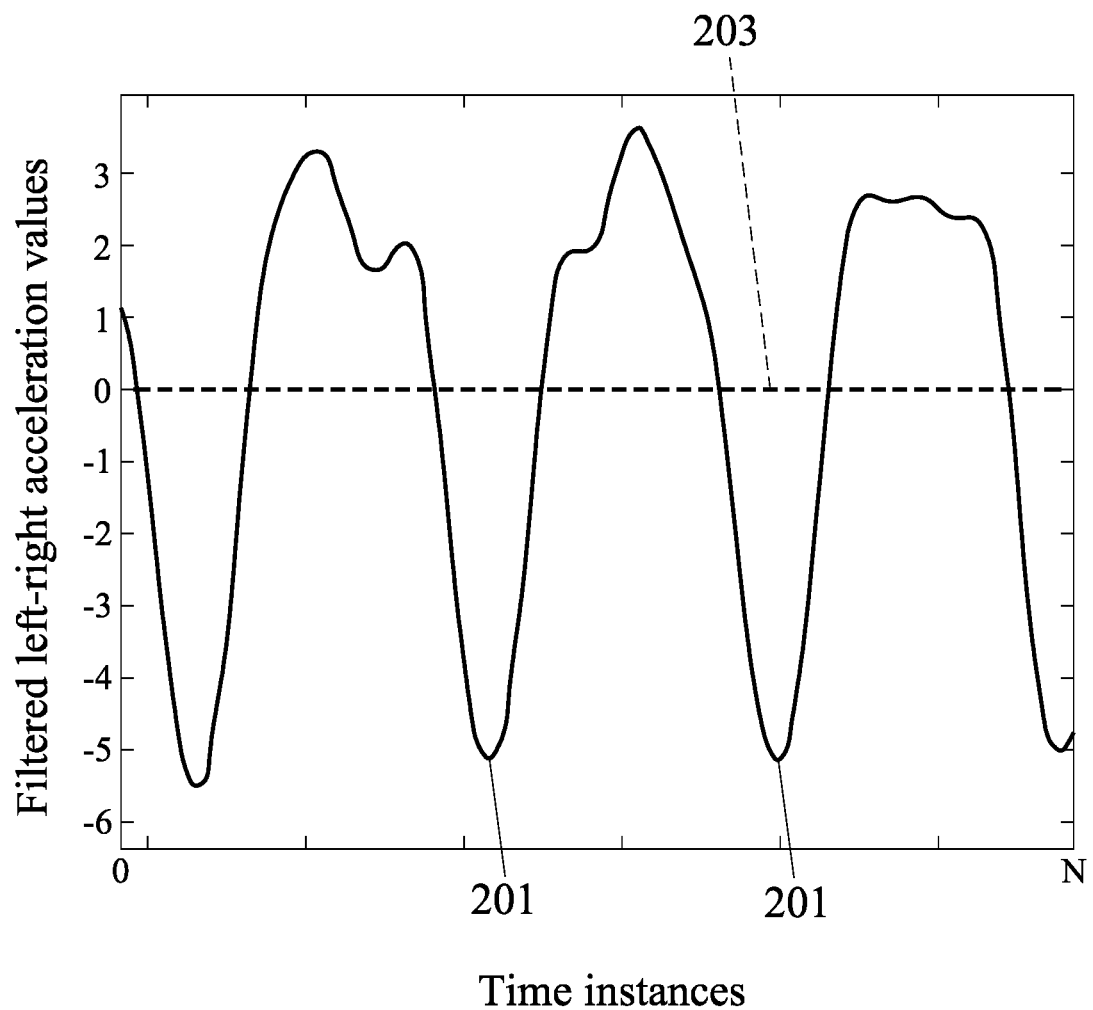
FIGS. 10 and 11 illustrate a first waveform and a second waveform constructed in the fourth exemplary implementation.

In sub-step 242, the processor 112 uses a band-pass filter to filter the adjusted sensor datasets individually, so as to obtain a number N of filtered sensor datasets each including a filtered front-rear acceleration value, a filtered left-right acceleration value and a filtered top-bottom acceleration value. Then, the processor 112 constructs a first waveform using the filtered left-right acceleration values of the filtered sensor datasets and the time instances. FIG. 10 illustrates a first waveform of the filtered left-right acceleration values of the filtered sensor datasets over the time instances constructed in sub-step 242.

Figure 11:
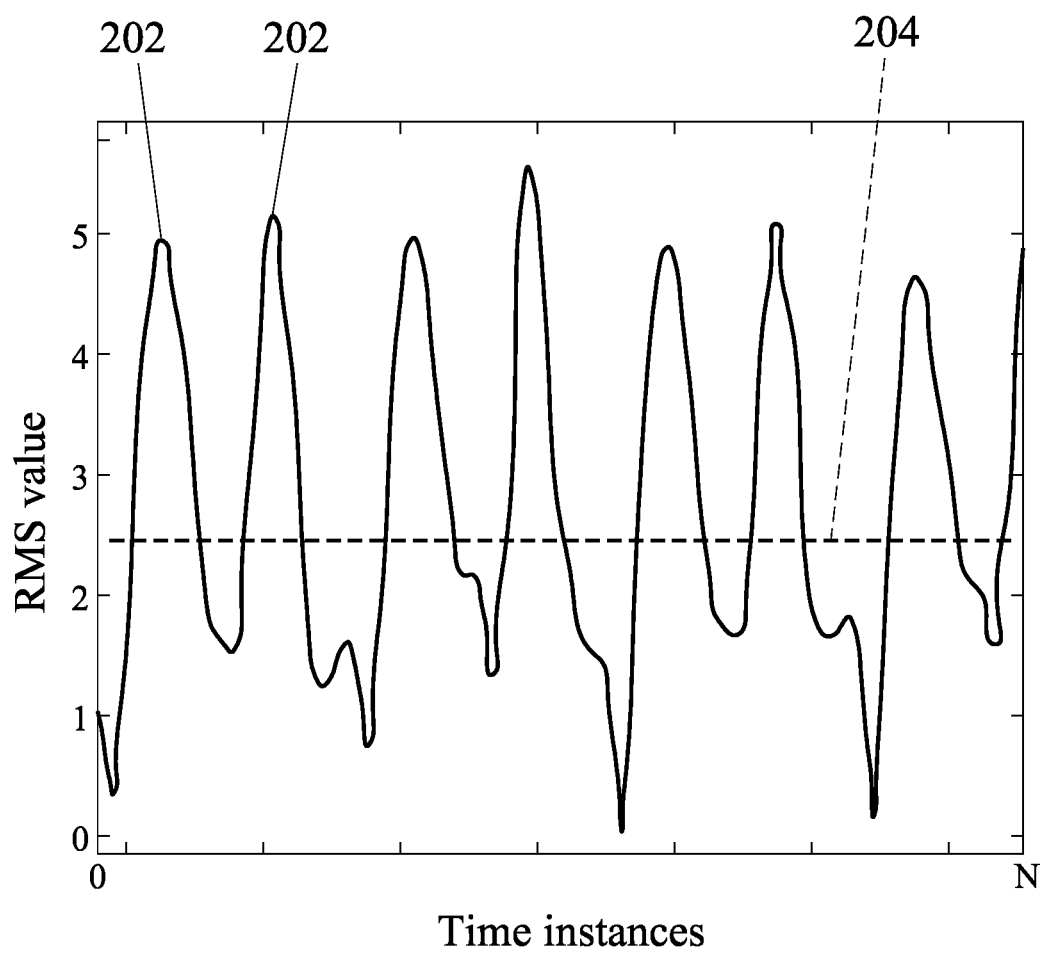

In sub-step 243, for each of the filtered sensor datasets, the processor 112 calculates an RMS value of the filtered front-rear acceleration value and the filtered left-right acceleration value, and constructs a second waveform using the RMS values calculated for the filtered sensor datasets and the corresponding time instances. It is noted that the calculation of the RMS value may be implemented in a manner similar to that as described in sub-step 222, and details thereof are omitted herein for the sake of brevity. FIG. 11 illustrates a second waveform of the RMS values over the time instances constructed in sub-step 243.

In sub-step 244, the processor 112 identifies a plurality of troughs on the first waveform that have values smaller than a first predetermined threshold 203 (depicted by the dashed line in FIG. 10), and determines a plurality of time instances that correspond with the identified troughs as the top time instances 201. It is noted that a trough located above the dashed line is not identified.

In sub-step 245, the processor 112 identifies a plurality of crests on the second waveform that have values larger than a second predetermined threshold 204 (depicted by the dashed line in FIG. 11), and determines a plurality of time instances that correspond with the identified crests as the bottom time instances 202.

Figure 12:
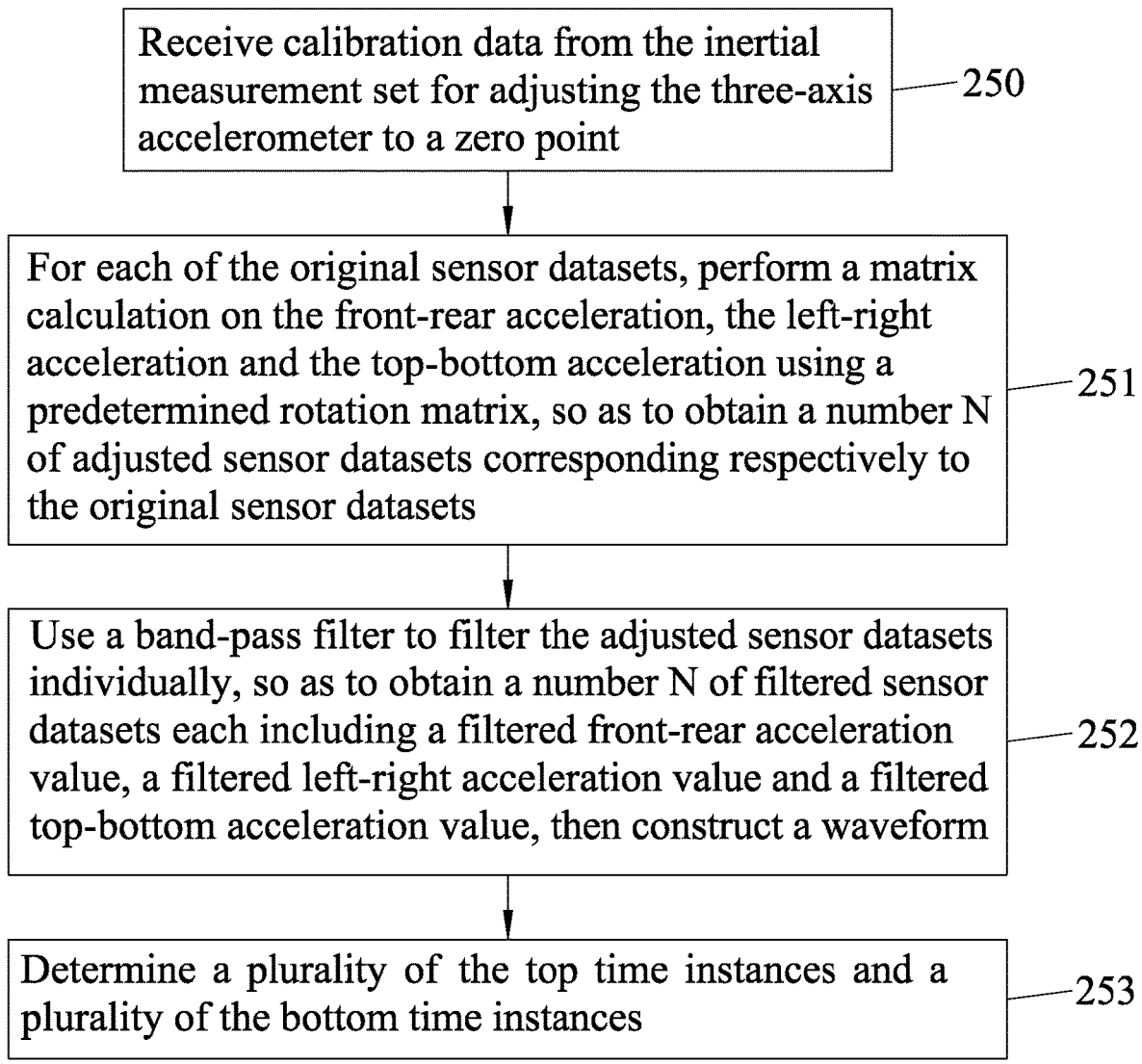
FIG. 12 is a flow chart illustrating sub-steps of a fifth exemplary implementation of the step of determining the plurality of top time instances and the plurality of bottom time instances according to some embodiments of the disclosure.

FIG. 12 is a flow chart illustrating sub-steps of a fifth exemplary implementation of step 2 according to some embodiments of the disclosure. In this implementation, the inertial measurement set 12 includes a three-axis accelerometer worn on a thigh of the rider. A number N of original sensor datasets are received from the sensor unit at a number N of corresponding successive time instances. Each of the original sensor datasets includes a front-rear acceleration associated with the front-rear direction with respect to the bicycle, a left-right acceleration associated with the left-right direction with respect to the bicycle, and a top-bottom acceleration associated with the top-bottom direction with respect to the bicycle.

In sub-step 250, the processor 112 receives calibration data from the inertial measurement set 12 for adjusting the three-axis accelerometer to a zero point. This may be done by the rider standing on the ground and stopping for a predetermined time period such that the data generated by the inertial measurement set 12 during the predetermined time period is transmitted to the electronic device 11 to serve as the calibration data.

In sub-step 251, for each of the original sensor datasets, the processor 112 performs a matrix calculation on the front-rear acceleration, the left-right acceleration and the top-bottom acceleration using a predetermined rotation matrix, so as to obtain a number N of adjusted sensor datasets corresponding respectively to the original sensor datasets. It is noted that the operations of the matrix calculation may be implemented in a manner similar to that as described in sub-step 231, and details thereof are omitted herein for the sake of brevity.

Figure 13:
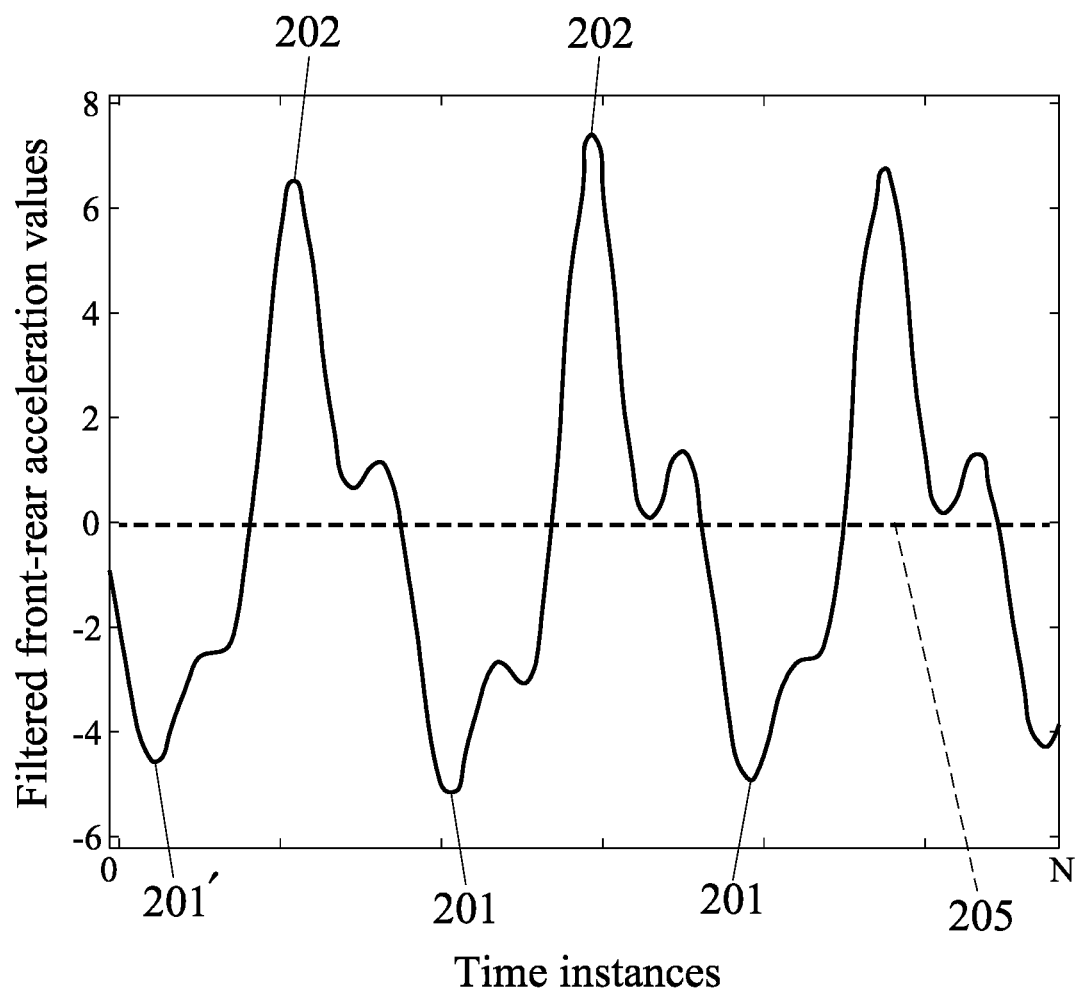
FIG. 13 illustrates a waveform constructed in the fifth exemplary implementation.

In sub-step 252, the electronic device 11 uses a band-pass filter to filter the adjusted sensor datasets individually, so as to obtain a number N of filtered sensor datasets each including a filtered front-rear acceleration value, a filtered left-right acceleration value and a filtered top-bottom acceleration value. Then, the processor 112 constructs a waveform using the filtered top-bottom acceleration values of the filtered sensor datasets and the corresponding time instances. FIG. 13 illustrates a waveform of the filtered front-rear acceleration values of the filtered sensor datasets over the time instances constructed in sub-step 252.

In sub-step 253, the processor 112 identifies a plurality of crests and a plurality of troughs on the waveform constructed in sub-step 252, and first determines a time instance corresponding with one of the filtered front-rear acceleration values that is the lowest as a first top time instance 201'. Afterward, the processor 112 further determines a time instance that is right after the first top time instance 201' and that corresponds with the crest which has a value larger than a predetermined threshold 205 (depicted by the dashed line in FIG. 13) as a bottom time instance 202, and then, determines a time instance that is right after the bottom time instance 202 that corresponds with the trough which has a value smaller than the predetermined threshold 205 as a top time instance 201. The above-mentioned determination is repeated with the top time instance 201 that is determined the latest serving as a reference for determining a subsequent bottom time instance 202, which then serves as a reference for determining a subsequent top time instance 201, so on and so forth, so as to determine a plurality of the top time instances 201 and a plurality of the bottom time instances 202.

Figure 14:
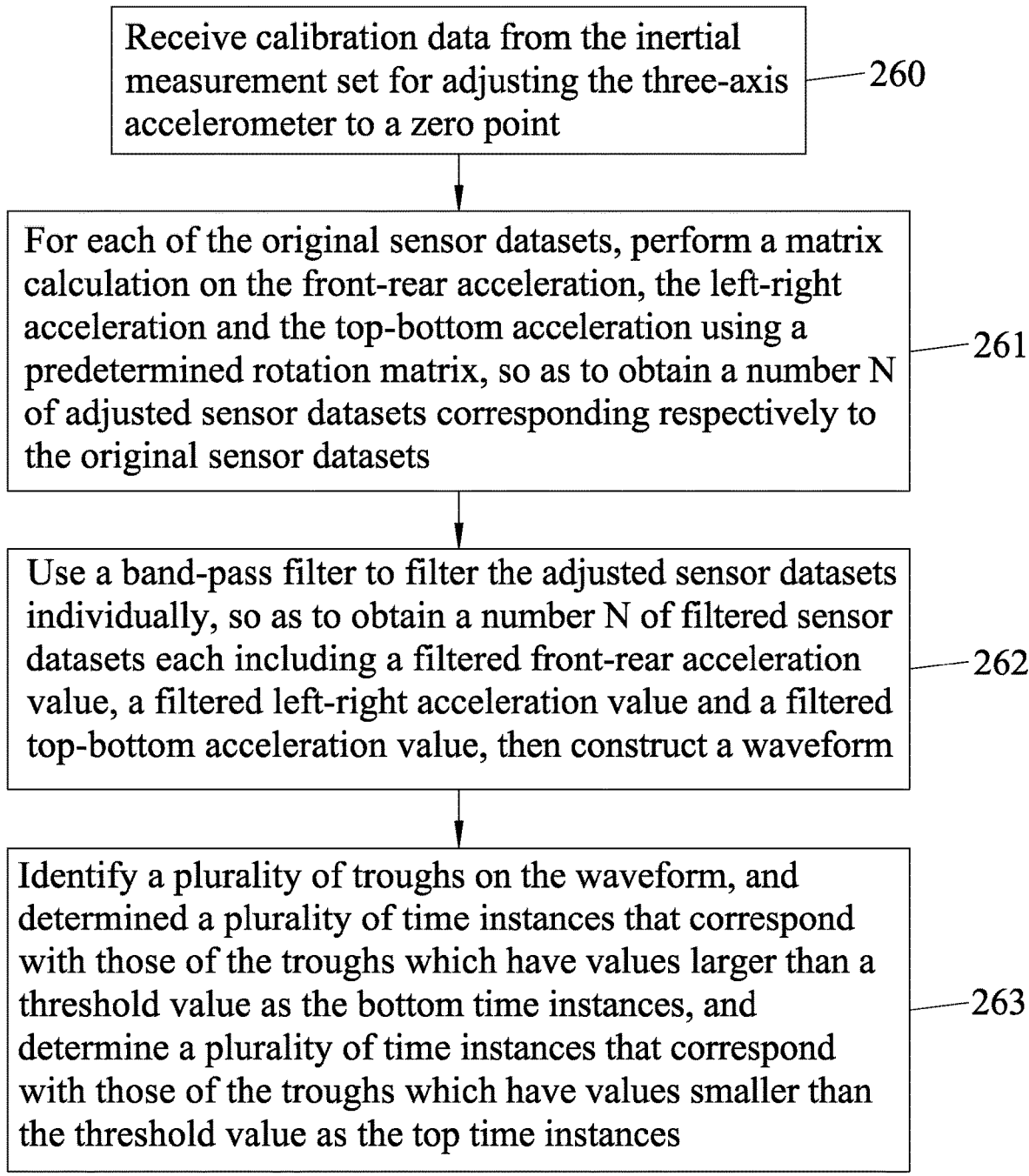
FIG. 14 is a flow chart illustrating sub-steps of a sixth exemplary implementation of the step of determining the plurality of top time instances and the plurality of bottom time instances according to some embodiments of the disclosure.

FIG. 14 is a flow chart illustrating sub-steps of a sixth exemplary implementation of step 2 according to some embodiments of the disclosure. In this implementation, the inertial measurement set 12 includes a three-axis accelerometer worn on a thigh of the rider. A number N of original sensor datasets are received from the sensor unit at a number N of corresponding successive time instances. Each of the original sensor datasets includes a front-rear acceleration associated with the front-rear direction with respect to the bicycle, a left-right acceleration associated with the left-right direction with respect to the bicycle, and a top-bottom acceleration associated with the top-bottom direction with respect to the bicycle.

In sub-step 260, the processor 112 receives calibration data from the inertial measurement set 12 for adjusting the three-axis accelerometer to a zero point. This may be done by the rider standing on the ground and stopping for a predetermined time period such that the data generated by the inertial measurement set 12 during the predetermined time period is transmitted to the electronic device 11 to serve as the calibration data.

In sub-step 261, for each of the original sensor datasets, the processor 112 performs a matrix calculation on the front-rear acceleration, the left-right acceleration and the top-bottom acceleration using a predetermined rotation matrix, so as to obtain a number N of adjusted sensor datasets corresponding respectively to the original sensor datasets. It is noted that the operation of the matrix calculation may be implemented in a manner similar to that as described in sub-step 231, and details thereof are omitted herein for the sake of brevity.

Figure 15:
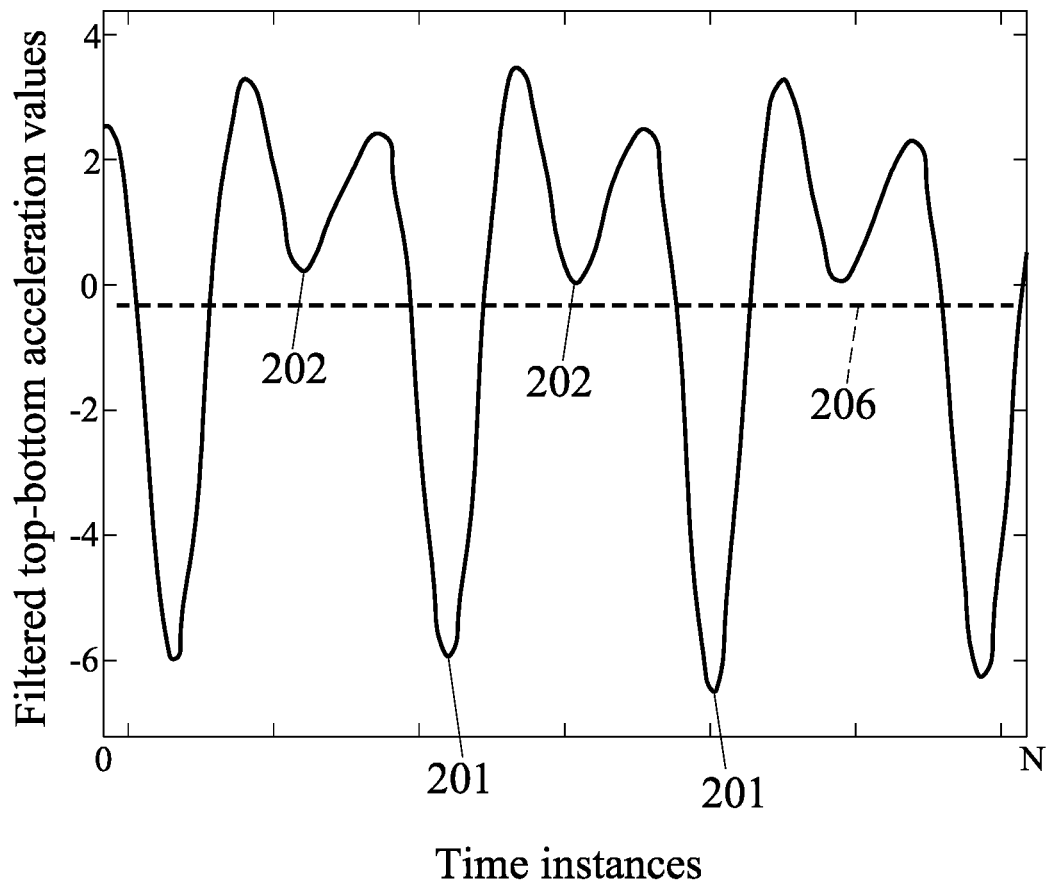
FIG. 15 illustrates a waveform constructed in the sixth exemplary implementation.

In sub-step 262, the electronic device 11 uses a band-pass filter to filter the adjusted sensor datasets individually, so as to obtain a number N of filtered sensor datasets each including a filtered front-rear acceleration value, a filtered left-right acceleration value and a filtered top-bottom acceleration value. Then, the processor 112 constructs a waveform using the filtered top-bottom acceleration values of the filtered sensor datasets and the corresponding time instances. FIG. 15 illustrates a waveform of the filtered top-bottom acceleration values of the filtered sensor datasets over the time instances constructed in sub-step 262.

In sub-step 263, the processor 112 identifies a plurality of troughs on the waveform, and determines a plurality of time instances that correspond with those of the troughs which have values larger than a threshold value 206 (depicted by the dashed line in FIG. 15) as the bottom time instances 202, and determines a plurality of time instances that correspond with those of the troughs which have values smaller than the threshold value as the top time instances 201.

It is noted that in the above implementations, the band-pass filter may have a passband between 0.1 to 4 Hz, and the low-pass filter may have a cutoff frequency of 2 Hz. In this embodiment, each of the band-pass filter and the low-pass filter is embodied using a well-known computer algorithm that may be executed by the processor 112.

In step 3, the processor 112 establishes a number of riding periods based on the plurality of top time instances 201 or the plurality of bottom time instances 202. Specifically, a specific riding period may be defined by two successive top time instances 201 or two successive bottom time instances 202. It is noted that two successive top time instances 201 or two successive bottom time instances 202 may indicate the action of the rider moving a pedal of the bicycle for one complete revolution. In some embodiments, the processor 112 may determine only the top time instances or only the bottom time instances in step 2 and use said only top/bottom time instances for establishing the riding periods in step 3.

In step 4, for each of the riding periods, the processor 112 generates an analysis result based on a number of original sensor datasets received within the riding period.

It is noted that a number of ways may be used to implement the operations of step 4. The following paragraphs describe some exemplary ways for implementing the operations of step 4 according to some embodiments of the disclosure.

Figure 16:
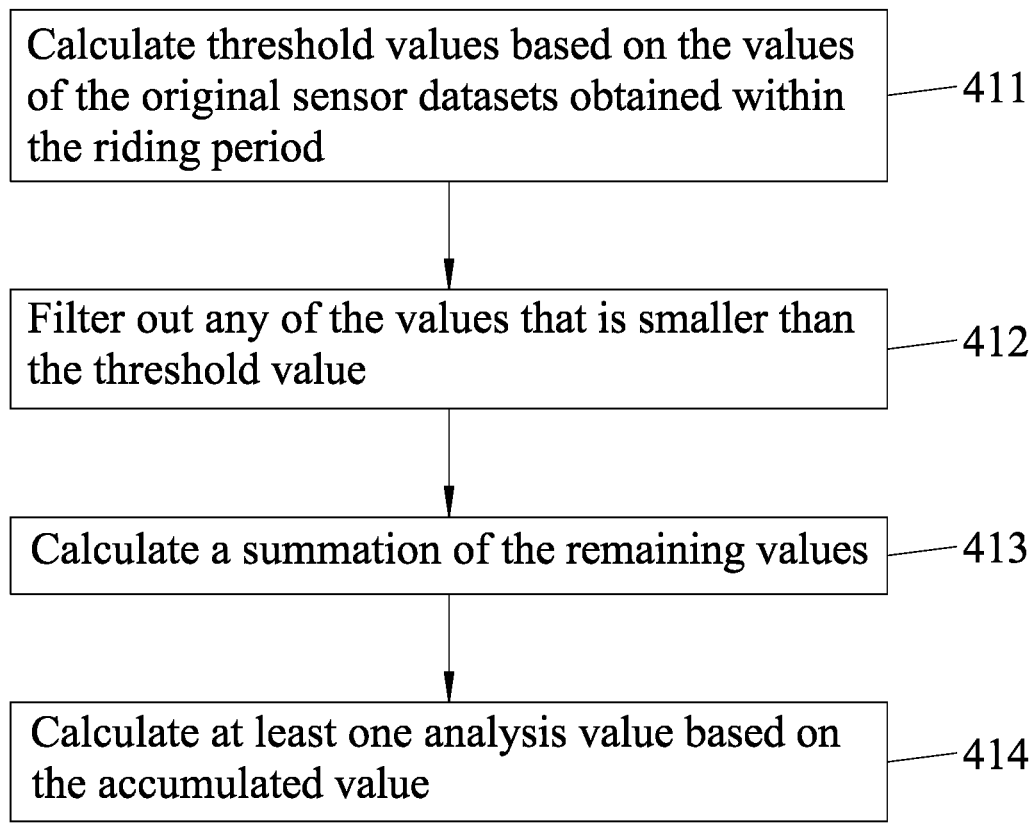
FIGS. 16 to 18 are flow charts illustrating sub-steps of exemplary implementations of a step of generating an analysis result according to embodiments of the disclosure.

FIG. 16 is a flow chart illustrating sub-steps of a first exemplary implementation of step 4 according to one embodiment of the disclosure. In this embodiment, the electrical signal sensor set 13 includes the first electrical signal sensor, the second electrical signal sensor, the third electrical signal sensor and the fourth electrical signal sensor as previously described. Each of the original sensor datasets includes a first value from the first electrical signal sensor, a second value from the second electrical signal sensor, a third value from the third electrical signal sensor, and a fourth value from the fourth electrical signal sensor.

For each of the riding periods, the first exemplary implementation of step 4 includes sub-steps 411 to 414.

In sub-step 411, the processor 112 calculates a first threshold value based on the first values of the original sensor datasets obtained within the riding period, a second threshold value based on the second values of the original sensor datasets obtained within the riding period, a third threshold value based on the third values of the original sensor datasets obtained within the riding period, and a fourth threshold value based on the fourth values of the original sensor datasets obtained within the riding period. It is noted that, in this embodiment, each threshold value may be a fraction (e.g., 20%) of a largest value detected by the corresponding sensor.

In sub-step 412, the processor 112 filters out any of the first values that is smaller than the first threshold value, filters out any of the second values that is smaller than the second threshold value, filters out any of the third values that is smaller than the third threshold value, and filters out any of the fourth values that is smaller than the fourth threshold value.

In sub-step 413, the processor 112 calculates a summation of the remaining first values (referred to as "first accumulated value" hereinafter), calculates a summation of the remaining second values (referred to as "second accumulated value" hereinafter), calculates a summation of the remaining third values (referred to as "third accumulated value" hereinafter), and calculates a summation of the remaining fourth values (referred to as "fourth accumulated value" hereinafter).

In sub-step 414, the processor 112 calculates at least one analysis value based on the first accumulated value, the second accumulated value, the third accumulated value and the fourth accumulated value. The analysis value(s) may be included in the analysis result.

It is noted that, in this embodiment, the processor 112 calculates a first ratio of the first accumulated value and the second accumulated value as a first analysis value, and calculates a second ratio of the third accumulated value and the fourth accumulated value as a second analysis value. The first ratio may be used to determine whether muscles on the left leg of the rider are working in a symmetric manner, and the second ratio may be used to determine whether muscles on the right leg of the rider are working in asymmetric manner. In other embodiments, other analysis values may be calculated. For example, a ratio of the first accumulated value and the third accumulated value may be calculated to determine whether muscles on the two legs of the rider are working in a symmetric manner.

It is noted that in some embodiments, the electrical signal sensor set 13 may only include the first sensor placed on the left leg of the rider, and the second sensor placed on the right leg of the rider.

In such cases, each of the original sensor datasets includes a first value from the first sensor and a second value from the second sensor, and step 4 is implemented as follows.

In sub-step 411, the processor 112 calculates a first threshold value based on the first values of the original sensor datasets obtained within the riding period, and a second threshold value based on the second values of the original sensor datasets obtained within the riding period. Each threshold value may be a fraction (e.g., 20%) of a largest value detected by the corresponding sensor.

In sub-step 412, the processor 112 filters out any of the first values that is smaller than the first threshold value, and filters out any of the second values that is smaller than the second threshold value.

In sub-step 413, the processor 112 calculates a summation of the remaining first values to obtain a first accumulated value, and calculates a summation of the remaining second values to obtain a second accumulated value.

In sub-step 414, the processor 112 calculates an analysis value to be included in the analysis result, based on the first accumulated value and the second accumulated value. For example, the analysis value in this embodiment is a ratio of the first accumulated value and the second accumulated value.

Figure 17:
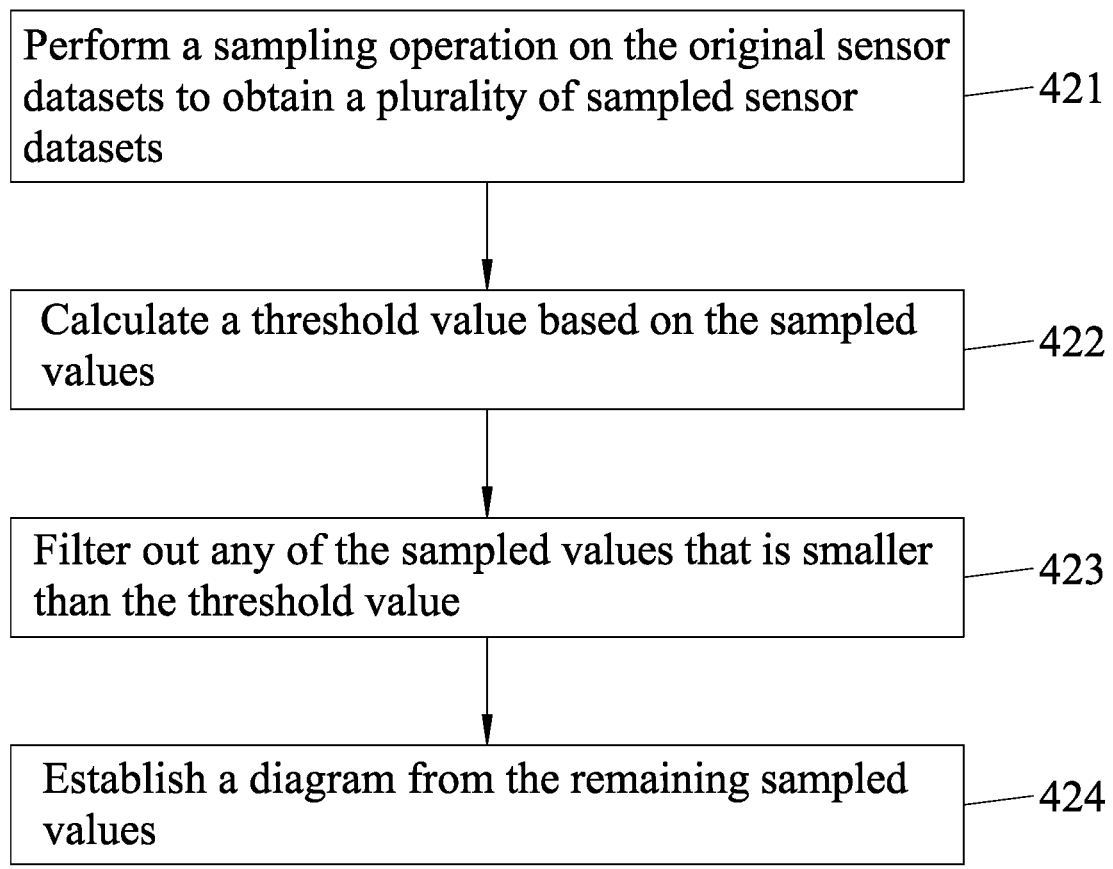

FIG. 17 is a flow chart illustrating sub-steps of a second exemplary implementation of step 4 according to one embodiment of the disclosure. In this embodiment, the electrical signal sensor set 13 includes the first electrical signal sensor, the second electrical signal sensor, the third electrical signal sensor and the fourth electrical signal sensor as previously described. For each of the riding periods, a number M of the original sensor datasets are obtained during the riding period. Each of the original sensor datasets includes a first sensor value from the first electrical signal sensor, a second sensor value from the second electrical signal sensor, a third sensor value from the third electrical signal sensor, and a fourth sensor value from the fourth electrical signal sensor.

In this embodiment, the riding period may be previously defined using two successive top time instances 201 or two successive bottom time instances 202.

For each of the riding periods, the second exemplary implementation of step 4 includes sub-steps 421 to 424.

In sub-step 421, the processor 112 performs a sampling operation on the original sensor datasets to obtain a plurality of sampled sensor datasets. Each of the sampled sensor datasets includes a sampled first values, a sampled second value, a sampled third value, and a sampled fourth value.

In one example, the sampling operation includes sequentially obtaining three hundred and sixty sampled first values, three hundred and sixty sampled second values, three hundred and sixty sampled third values and three hundred and sixty fourth sampled values within the riding period. Specifically, an $i^{th}$ one of the sampled (first or second or third or fourth) values may be an $(i*M)/360^{th}$ one of the (first or second or third or fourth) sensor values, where i=1, 2, 360. In the cases that (i*M)/360 yields a non-integer, an interpolation operation may be used to obtain an estimation of the $(i*M)/360^{th}$ one of the sample values. The interpolation operation may be expressed using the following equation:

$$\frac{(y_i - y_{i-1})}{(y_{i+1} - y_{i-1})} = \frac{(x_i - x_{i-1})}{(x_{i+1} - x_{i-1})}$$

where $x_i$ represents a time value that corresponds with the $(i*M)/360^{th}$ time instance, $x_{i-1}$ represents a time value that corresponds with a floor function of the $(i*M)/360^{th}$ time instance, $x_{i+1}$ represents a time value that corresponds with a floor function of the $(i*M)/360^{th}$ time instance plus one, $y_i$ represents a sensor value corresponding with the time value $x_i$, $y_{i-1}$ represents a sensor value corresponding with the time value $x_{i-1}$, and $y_{i+1}$ represents a sensor value corresponding with the time value $x_{i+1}$. As a result, the sample values of each of the electrical signal sensors are obtained.

In sub-step 422, the processor 112 calculates a first threshold value based on the sampled first values obtained in sub-step 421, calculates a second threshold value based on the sampled second values obtained in sub-step 421, calculates a third threshold value based on the sampled third values obtained in sub-step 421, and calculates a fourth threshold value based on the sampled fourth values obtained in sub-step 421. Each threshold value may be a fraction (e.g., 20%) of a largest value detected by the corresponding sensor.

In sub-step 423, the processor 112 filters out any of the sampled first values that is smaller than the first threshold value, filters out any of the sampled second values that is smaller than the second threshold value, filters out any of the sampled third values that is smaller than the third threshold value, and filters out any of the sampled fourth values that is smaller than the fourth threshold value.

In sub-step 424, the processor 112 establishes a diagram from the remaining sampled first, second, third and fourth values to be included in the analysis result.

Specifically, the operations of sub-step 424 may be done in a manner as described in M. Jorge and M. L. Hull. "Analysis of EMG Measurements during Bicycle Pedalling." *Journal of biomechanics*, 1986, 19.9:683-694 and Sylvain Dorel, Antoine Couturier, Francois Hug. "Intrasession Repeatability of Lower Limb Muscles Activation Pattern during Pedaling." *Journal of Electromyography and Kinesiology*, 2008, 18.5:857-865, and details thereof are omitted herein for the sake of brevity.

It is noted that in other embodiments, various numbers of sensors may be included in the electrical signal sensor set 13 (e.g., only one sensor), and the operations as described in FIG. 17 may be implemented with respect to the one sensor.

Figure 18:
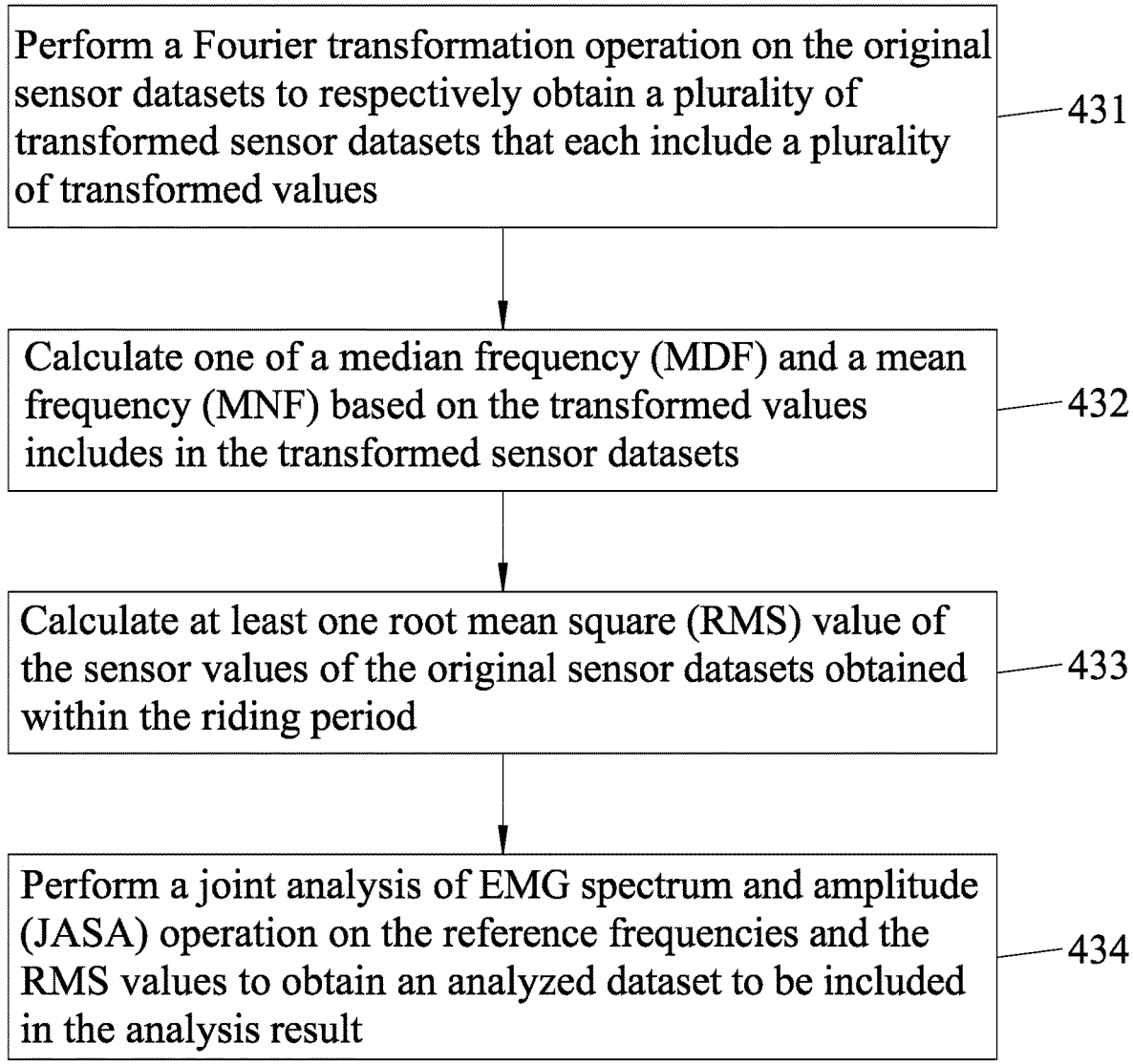

FIG. 18 is a flow chart illustrating sub-steps of a third exemplary implementation of step 4 according to one embodiment of the disclosure. In this embodiment, the electrical signal sensor set 13 includes the first electrical signal sensor, the second electrical signal sensor, the third electrical signal sensor and the fourth electrical signal sensor as previously described. Each of the original sensor datasets includes a first sensor value from the first electrical signal sensor, a second sensor value from the second electrical signal sensor, a third sensor value from the third electrical signal sensor, and a fourth sensor value from the fourth electrical signal sensor.

For each of the riding periods, the third exemplary implementation of step 4 includes sub-steps 431 to 434.

In sub-step 431, the processor 112 performs a Fourier transformation operation on the original sensor datasets to respectively obtain a plurality of transformed sensor datasets that each include a plurality of transformed values. That is, each of the transformed sensor datasets includes a first transformed value obtained from the first value of the respective original sensor dataset, a second transformed value obtained from the second values of the respective original sensor dataset, a third transformed value obtained from the third values of the respective original sensor dataset, and a fourth transformed value obtained from the fourth values of the respective original sensor dataset.

In sub-step 432, the processor 112 calculates one of a median frequency (MDF) and a mean frequency (MNF) based on the transformed values includes in the transformed sensor datasets obtained in sub-step 431. Specifically, the processor 112 calculates four MDFs or four MNFs (hereinafter referred to as "reference frequencies"), one of the reference frequencies is obtained from the first transformed values from the transformed sensor datasets, one of the reference frequencies is obtained from the second transformed values from the transformed sensor datasets, one of the reference frequencies is obtained from the third transformed values from the transformed sensor datasets, and one of the reference frequencies is obtained from the fourth transformed values from the transformed sensor datasets. The MDF and MNF may be expressed using the following equations:

$$MDF = \frac{1}{2}\sum_{j=1}^{M} P_j$$

$$MNF = \sum_{j=1}^{M} f_j P_j / \sum_{j=1}^{M} P_j$$

where M represents a total frequency length, $P_j$ represents a power value of a $j^{th}$ frequency in the power spectrum, and $f_j$ represents a frequency value of a $j^{th}$ frequency in the power spectrum.

In sub-step 433, the processor 112 calculates at least one root mean square (RMS) value of the sensor values of the original sensor datasets obtained within the riding period.

Specifically, the processor 112 calculates a first RMS value of the first sensor values of the original sensor datasets, a second RMS value of the second sensor values of the original sensor datasets, a third RMS value of the third sensor values, of the original sensor datasets and a fourth RMS value of the fourth sensor values of the original sensor datasets.

Each RMS value $X_{rms}$ may be expressed using the following equation:

$$X_{rms} = \sqrt{\sum_{i=1}^{K} X_i^2 / K}$$

where $X_i$ represents an $i^{th}$ one of the sensor values, and K represents the number of sensor values obtained within the riding period. It is noted that in some embodiments, the absolute values of the sensor values are used for calculating the RMS value. In some embodiments, a smoothing approximation operation is applied to the absolute values before calculating the RMS value.

In sub-step 434, the processor 112 performs a joint analysis of EMG spectrum and amplitude (JASA) operation on the reference frequencies and the RMS values to obtain an analyzed dataset to be included in the analysis result.

Specifically, the operations of sub-step 434 may involve analysis of a percentage of muscle usage, and may be done in a manner as described in Alwin Luttmann, Matthias Jager, Wolfgang Laurig. "Electromyographical Indication of Muscular Fatigue in Occupational Field Studies." *International Journal of Industrial Ergonomics*, 2000, 25.6:645-660, and details thereof are omitted herein for the sake of brevity.

To sum up, embodiments of the disclosure provide a method and a system for analyzing a posture of a rider riding a bicycle. In the method, the processor determines a plurality of top time instances and a plurality of bottom time instances using one of the exemplary implementations as described above, and establishes a number of riding periods based on the plurality of top time instances or the plurality of bottom time instances. Afterwards, the processor may be configured to perform analysis of the rider with respect to each of the riding periods, so as to generate the associated analysis results.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for analyzing a posture of a user, the method being implemented using a system that includes a processor, and a sensor unit which is coupled to the processor and which includes an inertial measurement set and an electrical signal sensor set that are to be worn by the user, the inertial measurement set including a three-axis accelerator worn on a leg of the user, the method comprising:
   while the user is doing a physical activity, continuously receiving, by the processor, a plurality of original sensor datasets from the sensor unit, each of the original sensor datasets being associated with a specific time instance and including data generated by the inertial measurement set and the electrical signal sensor set;
   a) determining, by the processor, a plurality of extreme time instances at which the inertial measurement set was at one of a relative highest location and a relative lowest location;
   b) establishing, by the processor, a number of activity periods based on the plurality of extreme time instances; and
   c) for each of the activity periods, generating, by the processor, an analysis result with respect to a number of original sensor datasets received within the activity period;
   wherein a number N of original sensor datasets are received from the sensor unit at a number N of corresponding successive time instances, each of the original sensor datasets including a front-rear acceleration associated with a front-rear direction, a left-right acceleration associated with a left-right direction, and a top-bottom acceleration associated with a top-bottom direction;
   wherein step a) includes
      a-1) using a band-pass filter to filter the original sensor datasets individually, so as to obtain a number N of filtered sensor datasets,
      a-2) for each of the filtered sensor datasets, calculating a root mean square (RMS) value of the front-rear acceleration and the left-right acceleration,
      a-3) using a low-pass filter to filter the RMS values calculated for the filtered sensor datasets so as to obtain a number N of filtered RMS values, and constructing a waveform using the filtered RMS values and the time instances, and
      a-4) determining the plurality of extreme time instances by one of
         identifying a plurality of crests on the waveform, and determining a plurality of time instances that correspond with the crests as a plurality of top time instances at which the inertial measurement set was at the relative highest location, the plurality of top time instances serving as the extreme time instances, and
         identifying a plurality of troughs on the waveform and determining a plurality of time instances that correspond with the troughs as a plurality of bottom time instances at which the inertial measurement set was at the relative lowest location, the plurality of bottom time instances serving as the extreme time instances.

2. The method of claim 1, the inertial measurement set further including a gyroscope worn on a leg of the user, wherein:

a number N of original sensor datasets are received from the sensor unit at a number N of corresponding successive time instances, each of the original sensor datasets including an angular velocity of the inertial measurement set;

step a) includes
- a-1) calculating a number (N−1) of angular displacements, each of the angular displacements being associated with a time period between two successive time instances,
- a-2) for each of the time instances, calculating a corresponding angular location of the inertial measurement set, and constructing a waveform using the angular locations and the time instances, and
- a-3) determining the plurality of extreme time instances by one of
  - identifying a plurality of crests on the waveform, and determining a plurality of time instances that correspond with the crests as a plurality of top time instances at which the inertial measurement set was at the relative highest location, the plurality of top time instances serving as the extreme time instances, and
  - identifying a plurality of troughs on the waveform and determining a plurality of time instances that correspond with the troughs as a plurality of bottom time instances at which the inertial measurement set was at the relative lowest location, the plurality of bottom time instances serving as the extreme time instances.

3. The method of claim 1, the electrical signal sensor set including a first sensor and a second sensor, wherein:
each of the original sensor datasets includes a first value from the first sensor and a second value from the second sensor; and
step c) includes, for each of the activity periods,
- c-1) calculating a first threshold value based on the first values of the sensor datasets obtained within the activity period, and calculating a second threshold value based on the second values of the sensor datasets obtained within the activity period,
- c-2) filtering out any of the first values that is smaller than the first threshold value, and filtering out any of the second values that is smaller than the second threshold value,
- c-3) calculating a first accumulated value that is a summation of the remaining first values, and calculating a second accumulated value that is a summation of the remaining second values, and
- c-4) calculating an analysis value based on the first accumulated value and the second accumulated value, the analysis value to be included in the analysis result.

4. The method of claim 1, wherein:
each of the original sensor datasets includes a sensor value;
step b) includes constructing a waveform using the sensor values of the original sensor datasets and the time instances, and establishing, by the processor, the activity period using two successive top time instances or two successive bottom time instances obtained using the waveform, wherein the inertial measurement set was at a relative highest location at each of the top time instances, and was at a relative lowest location at each of the bottom time instances, and the top and bottom time instances serving as the extreme time instances; and step c) includes, for each of the activity periods,
- c-1) performing a sampling operation on the original sensor dataset to obtain a plurality of sampled sensor datasets each including a sampled value,
- c-2) calculating a threshold value based on the sampled values of the sampled sensor datasets obtained within the activity period,
- c-3) filtering out any of the sampled values that is smaller than the threshold value,
- c-4) establishing a diagram from the remaining sampled values, the diagram to be included in the analysis result.

5. The method of claim 1, wherein:
each of the original sensor datasets includes a sensor value;
step c) includes, for each of the activity periods,
- c-1) performing a Fourier transformation operation on the original sensor datasets to respectively obtain a plurality of transformed sensor dataset each including a transformed value,
- c-2) calculating a reference frequency from the transformed values of the transformed sensor datasets obtained in sub-step c-1), the reference frequency being one of a median frequency (MDF) and a mean frequency (MNF),
- c-3) calculating a root mean square (RMS) value of the sensor values of the original sensor datasets obtained within the activity period,
- c-4) performing a joint analysis of EMG spectrum and amplitude (JASA) operation on the reference frequency and the RMS value to obtain an analyzed dataset to be included in the analysis result.

6. The method of claim 1, wherein step a) includes determining a plurality of top time instances at which the inertial measurement set was at the relative highest location to serve as the extreme time instances.

7. The method of claim 1, wherein step a) includes determining a plurality of bottom time instances at which the inertial measurement set was at the relative lowest location to serve as the extreme time instances.

8. A system comprising an electronic device, and a sensor unit that includes an inertial measurement set and an electrical signal sensor set, said electronic device being coupled to said inertial measurement set and said electrical signal sensor set, and including a processor and a data storage stores a software application, wherein, when executing the software application, said processor is configured to control the system to perform steps of a method of claim 1.

9. A non-transitory computer-readable storage medium storing instructions that, when executed by a processor, cause the processor to implement steps of the method of claim 1.

10. The method as claimed in claim 1, the physical activity being the user riding a bicycle, wherein:
in step b), each of the plurality of activity periods is a riding period;
in step c), for each of the riding periods, the processor generates an analysis result with respect to a number of original sensor datasets received within the riding period; and
each of the front-rear direction, the left-right direction and the top-bottom direction is defined with respect to the bicycle.

11. A method for analyzing a posture of a user, the method being implemented using a system that includes a processor, and a sensor unit which is coupled to the processor and which includes an inertial measurement set and an electrical signal sensor set that are to be worn by the user, the inertial measurement set including a three-axis accelerator worn on a leg of the user, the method comprising:

while the user is doing a physical activity, continuously receiving, by the processor, a plurality of original sensor datasets from the sensor unit, each of the original sensor datasets being associated with a specific time instance and including data generated by the inertial measurement set and the electrical signal sensor set;

a) determining, by the processor, a plurality of extreme time instances at which the inertial measurement set was at one of a relative highest location and a relative lowest location;

b) establishing, by the processor, a plurality of activity periods based on the plurality of extreme time instances; and c) for each of the activity periods, generating, by the processor, an analysis result with respect to a number of original sensor datasets received within the activity period;

wherein a number N of original sensor datasets are received from the sensor unit at a number N of corresponding successive time instances, each of the original sensor datasets including a front-rear acceleration associated with a front-rear direction, a left-right acceleration associated with a left-right direction, and a top-bottom acceleration associated with a top-bottom direction;

wherein step a) includes a-1) for each of the original sensor datasets, performing a matrix calculation on the front-rear acceleration, the left-right acceleration and the top-bottom acceleration using a predetermined rotation matrix, so as to obtain a number N of adjusted sensor datasets that correspond respectively to the original sensor datasets, a-2) using a band-pass filter to filter the adjusted sensor datasets individually, so as to obtain a number N of filtered sensor datasets, each of the number N of filtered sensor datasets including a filtered front-rear acceleration, a filtered left-right acceleration and a filtered top-bottom acceleration, a-3) for each of the filtered sensor datasets, calculating a root mean square (RMS) value of the filtered front-rear acceleration and the filtered left-right acceleration, a-4) using a low-pass filter to filter the RMS values calculated for the filtered sensor datasets so as to obtain a number N of filtered RMS values, and constructing a waveform using the filtered RMS values and the time instances, and a-5) determining the plurality of extreme time instances by one of identifying a plurality of crests on the waveform, and determining a plurality of time instances that correspond with the crests as a plurality of top time instances at which the inertial measurement set was at the relative highest location, the plurality of top time instances serving as the extreme time instances, and identifying a plurality of troughs on the waveform and determining a plurality of time instances that correspond with the troughs as a plurality of bottom time instances at which the inertial measurement set was at the relative lowest location, the plurality of bottom time instances serving as the extreme time instances.

12. The method as claimed in claim 11, the physical activity being the user riding a bicycle, wherein:

in step b), each of the plurality of activity periods is a riding period;

in step c), for each of the riding periods, the processor generates an analysis result with respect to a number of original sensor datasets received within the riding period; and each of the front-rear direction, the left-right direction and the top-bottom direction is defined with respect to the bicycle.

13. A method for analyzing a posture of a user, the method being implemented using a system that includes a processor, and a sensor unit which is coupled to the processor and which includes an inertial measurement set and an electrical signal sensor set that are to be worn by the user, the inertial measurement set including a three-axis accelerator worn on a leg of the user, the method comprising:

while the user is doing a physical activity, continuously receiving, by the processor, a plurality of original sensor datasets from the sensor unit, each of the original sensor datasets being associated with a specific time instance and including data generated by the inertial measurement set and the electrical signal sensor set;

a) determining, by the processor, a plurality of extreme time instances at which the inertial measurement set was at one of a relative highest location and a relative lowest location;

b) establishing, by the processor, a plurality of activity periods based on the plurality of extreme time instances; and c) for each of the activity periods, generating, by the processor, an analysis result with respect to a number of original sensor datasets received within the activity period;

wherein a number N of original sensor datasets are received from the sensor unit at a number N of corresponding successive time instances, each of the original sensor datasets including a front-rear acceleration associated with a front-rear direction, a left-right acceleration associated with a left-right direction, and a top-bottom acceleration associated with a top-bottom direction;

wherein step a) includes a-1) for each of the original sensor datasets, performing a matrix calculation on the front-rear acceleration, the left-right acceleration and the top-bottom acceleration using a predetermined rotation matrix, so as to obtain a number N of adjusted sensor datasets that correspond respectively to the original sensor datasets, a-2) using a band-pass filter to filter the adjusted sensor datasets individually, so as to obtain a number N of filtered sensor datasets, each of which includes a filtered front-rear acceleration value and a filtered left-right acceleration value, and constructing a first waveform using the filtered left-right acceleration values of the filtered sensor datasets and the time instances, a-3) for each of the filtered sensor datasets, calculating a root mean square (RMS) value of the filtered front-rear acceleration value and the filtered left-right acceleration value, and constructing a second waveform using the RMS values and the time instances, and a-4) determining the plurality of extreme time instances by one of identifying a plurality of troughs on the first waveform that have values smaller than a first predetermined threshold, and determining a plurality of time instances that correspond with the troughs as a plurality of top time instances at which the inertial measurement set was at the relative highest location, the plurality of top time instances serving as the extreme time instances, and identifying a plurality of crests on the second waveform that have values larger than a second predetermined threshold, and determining a plurality of time instances that correspond with the crests as a plurality of bottom time instances at which the inertial measurement set was at the relative lowest location, the plurality of bottom time instances serving as the extreme time instances.

14. The method as claimed in claim 13, the physical activity being the user riding a bicycle, wherein:
in step b), each of the plurality of activity periods is a riding period;
in step c), for each of the riding periods, the processor generates an analysis result with respect to a number of original sensor datasets received within the riding period; and
each of the front-rear direction, the left-right direction and the top-bottom direction is defined with respect to the bicycle.

15. A method for analyzing a posture of a user, the method being implemented using a system that includes a processor, and a sensor unit which is coupled to the processor and which includes an inertial measurement set and an electrical signal sensor set that are to be worn by the user, the inertial measurement set including a three-axis accelerator worn on a leg of the user, the method comprising:
while the user is doing a physical activity, continuously receiving, by the processor, a plurality of original sensor datasets from the sensor unit, each of the original sensor datasets being associated with a specific time instance and including data generated by the inertial measurement set and the electrical signal sensor set;
a) determining, by the processor, a plurality of extreme time instances at which the inertial measurement set was at one of a relative highest location and a relative lowest location;
b) establishing, by the processor, a plurality of activity periods based on the plurality of extreme time instances; and
c) for each of the activity periods, generating, by the processor, an analysis result with respect to a number of original sensor datasets received within the activity period;
wherein a number N of original sensor datasets are received from the sensor unit at a number N of corresponding successive time instances, each of the original sensor datasets including a front-rear acceleration associated with a front-rear direction, a left-right acceleration associated with a left-right direction, and a top-bottom acceleration associated with a top-bottom direction;
wherein step a) includes
a-1) for each of the original sensor datasets, performing a matrix calculation on the front-rear acceleration, the left-right acceleration and the top-bottom acceleration using a predetermined rotation matrix, so as to obtain a number N of adjusted sensor datasets that correspond respectively to the original sensor datasets, a-2) using a band-pass filter to filter the adjusted sensor datasets individually, so as to obtain a number N of filtered sensor datasets, each of which includes a filtered front-rear acceleration value a filtered top-bottom acceleration value, and constructing a waveform using the filtered top-bottom acceleration values of the filtered sensor datasets and the time instances,
a-3) determining the plurality of extreme time instances by
identifying a plurality of crests and a plurality of troughs on the waveform,
determining a time instance that corresponds with one of the filtered front-rear acceleration values that is the lowest as a first top time instance,
determining a time instance that is right after the first top time instance and that corresponds with a crest which has a value larger than a predetermined threshold as a bottom time instance,
determining a time instance that is right after the bottom time instance that corresponds with a trough which has a value larger than the predetermined threshold as another top time instance, and
repeating the determinations with the top time instance that is determined the latest serving as a reference for determining a subsequent bottom time instance, which then serves as a reference for determining a subsequent top time instance, so on and so forth, so as to determine a plurality of the top time instances and a plurality of the bottom time instances, wherein the inertial measurement set was at a relative highest location at each of the top time instances, and was at a relative lowest location at each of the bottom time instances, and the top and bottom time instances serving as the extreme time instances.

16. The method as claimed in claim 15, the physical activity being the user riding a bicycle, wherein:
in step b), each of the plurality of activity periods is a riding period;
in step c), for each of the riding periods, the processor generates an analysis result with respect to a number of original sensor datasets received within the riding period; and
each of the front-rear direction, the left-right direction and the top-bottom direction is defined with respect to the bicycle.

17. A method for analyzing a posture of a user, the method being implemented using a system that includes a processor, and a sensor unit which is coupled to the processor and which includes an inertial measurement set and an electrical signal sensor set that are to be worn by the user, the inertial measurement set including a three-axis accelerator worn on a leg of the user, the method comprising:
while the user is doing a physical activity, continuously receiving, by the processor, a plurality of original sensor datasets from the sensor unit, each of the original sensor datasets being associated with a specific time instance and including data generated by the inertial measurement set and the electrical signal sensor set;
a) determining, by the processor, a plurality of extreme time instances at which the inertial measurement set was at one of a relative highest location and a relative lowest location;
b) establishing, by the processor, a plurality of activity periods based on the plurality of extreme time instances; and c) for each of the activity periods, generating, by the processor, an analysis result with respect to a number of original sensor datasets received within the activity period;

wherein a number N of original sensor datasets are received from the sensor unit at a number N of corresponding successive time instances, each of the original sensor datasets including a front-rear acceleration associated with a front-rear direction, a left-right acceleration associated with a left-right direction, and a top-bottom acceleration associated with a top-bottom direction;

wherein step a) includes a-1) for each of the original sensor datasets, performing a matrix calculation on the front-rear acceleration, the left-right acceleration and the top-bottom acceleration using a predetermined rotation matrix, so as to obtain a number N of adjusted sensor datasets that respectively corresponding to the original sensor datasets, a-2) using a band-pass filter to filter the adjusted sensor datasets individually, so as to obtain a number N of filtered sensor datasets, each of which includes a filtered top-bottom acceleration value, and constructing a waveform using the filtered top-bottom acceleration values of the filtered sensor datasets and the time instances, a-3) determining the plurality of extreme time instances by one of identifying a plurality of troughs on the waveform, and determining a plurality of time instances that correspond with those of the troughs which have values larger than a threshold value as a plurality of bottom time instances at which the inertial measurement set was at the relative lowest location, the plurality of bottom time instances serving as the extreme time instances, and identifying a plurality of troughs on the waveform, and determining a plurality of time instances that correspond with those of the troughs which have values smaller than the threshold value as a plurality of top time instances at which the inertial measurement set was at the relative highest location, the plurality of top time instances serving as the extreme time instances.

18. The method as claimed in claim 17, the physical activity being the user riding a bicycle, wherein:

in step b), each of the plurality of activity periods is a riding period;

in step c), for each of the riding periods, the processor generates an analysis result with respect to a number of original sensor datasets received within the riding period; and each of the front-rear direction, the left-right direction and the top-bottom direction is defined with respect to the bicycle.

* * * * *